(12) United States Patent
Ohbayashi

(10) Patent No.: US 6,990,589 B1
(45) Date of Patent: Jan. 24, 2006

(54) RECORDING AND/OR PLAYBACK APPARATUS AND METHOD

(75) Inventor: Masayuki Ohbayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1083 days.

(21) Appl. No.: 09/687,543

(22) Filed: Oct. 13, 2000

(30) Foreign Application Priority Data

Oct. 15, 1999 (JP) ............................ P11-293788

(51) Int. Cl.
 G06F 11/30 (2006.01)
 G06F 12/14 (2006.01)
 H04L 9/32 (2006.01)

(52) U.S. Cl. .................. 713/193; 713/165; 713/190; 726/32; 726/34; 726/35

(58) Field of Classification Search ............. 713/165, 713/193; 726/32, 35
See application file for complete search history.

(56) References Cited

U.S. PATENT DOCUMENTS 5,917,908 A * 6/1999 Takenaka et al. .......... 713/190
6,134,378 A * 10/2000 Abe et al. ................... 386/52
6,392,964 B2 * 5/2002 Koyata et al. ............ 369/30.04

FOREIGN PATENT DOCUMENTS

| EP | 0713334 | 5/1996 |
|---|---|---|
| GB | 2306044 | 4/1997 |
| GB | 2306754 | 5/1997 |
| GB | 2328552 | 2/1999 |
| GB | 2329509 | 3/1999 |
| WO | 9944202 | 9/1999 |

* cited by examiner

Primary Examiner—Gilberto Barron, Jr.
Assistant Examiner—Samson Lemma
(74) Attorney, Agent, or Firm—Jay H. Maioli

(57) ABSTRACT

A recording and/or playback apparatus having a first storage medium including a management region and a data region, an initializing device for initializing the first storage medium so that the first storage medium includes the management region and the data region, a generating device for generating a predetermined value when the initialization is performed, a second storage medium storing the predetermined value therein, a transforming device for applying a transformation to the predetermined value so as to be a different value, and a control device for controlling the output of the transforming device so as to store the output in the management region.

21 Claims, 22 Drawing Sheets

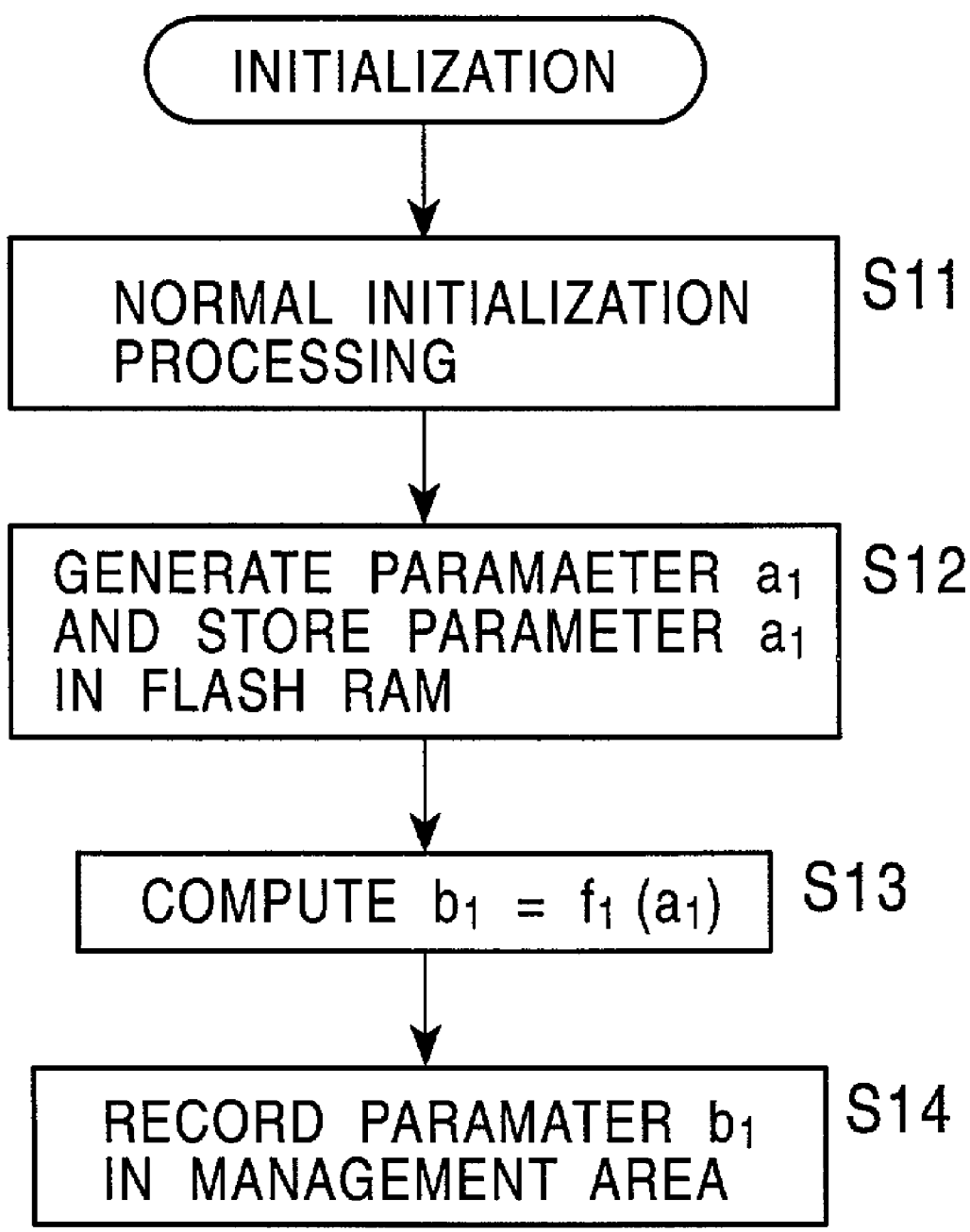

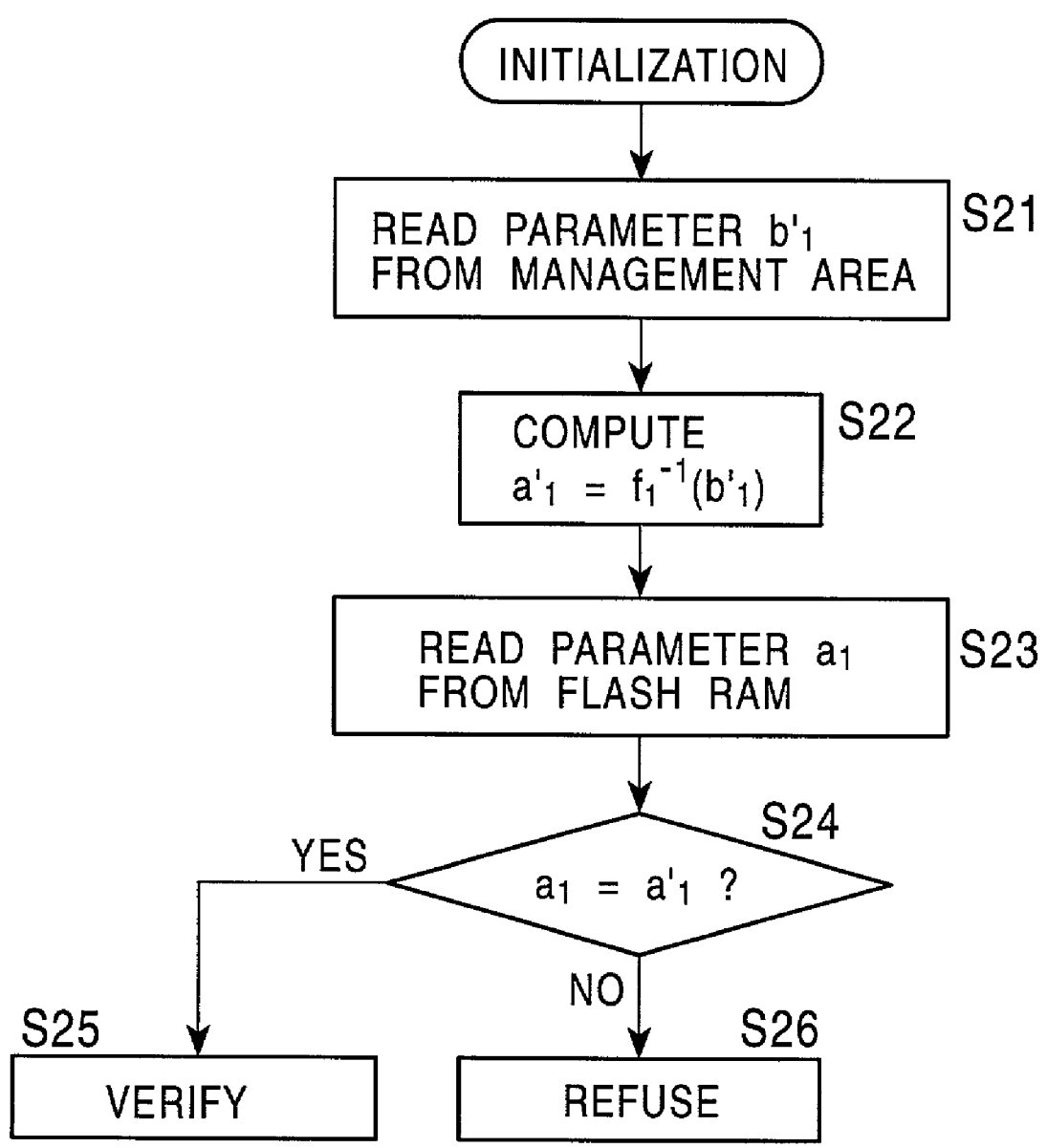

FIG. 10

| CLUSTER NO. | NEXT CLUSTER NO. |
|---|---|
| CL0 | LCL0 |
| CL1 | LCL1 |
| CL2 | LCL2 |
| CL3 | LCL3 |
| ⋮ | ⋮ |
| CL(N) | LCL(N) |

~220

| FILE NAME | PARAMETER | FILE SIZE | CREATION TIME, MODIFICATION TIME | OTHER ATTRIBUTE INFORMATION |
|---|---|---|---|---|
| ABC | ④ | size 1 | yymmdd | .... |
| DEF | 7 | size 2 | yymmdd | .... |

| CLUSTER NO. | NEXT CLUSTER NO. |
|---|---|
| CL0 | |
| CL1 | 9 |
| CL2 | 10 |
| CL3 | 6 |
| CL4 | |
| CL5 | 2 |
| CL6 | 1 |
| CL7 | |
| CL8 | |
| CL9 | 11 |
| CL10 | 13 |
| CL11 | 0 |
| CL12 | |
| CL13 | 0 |
| CL14 | |

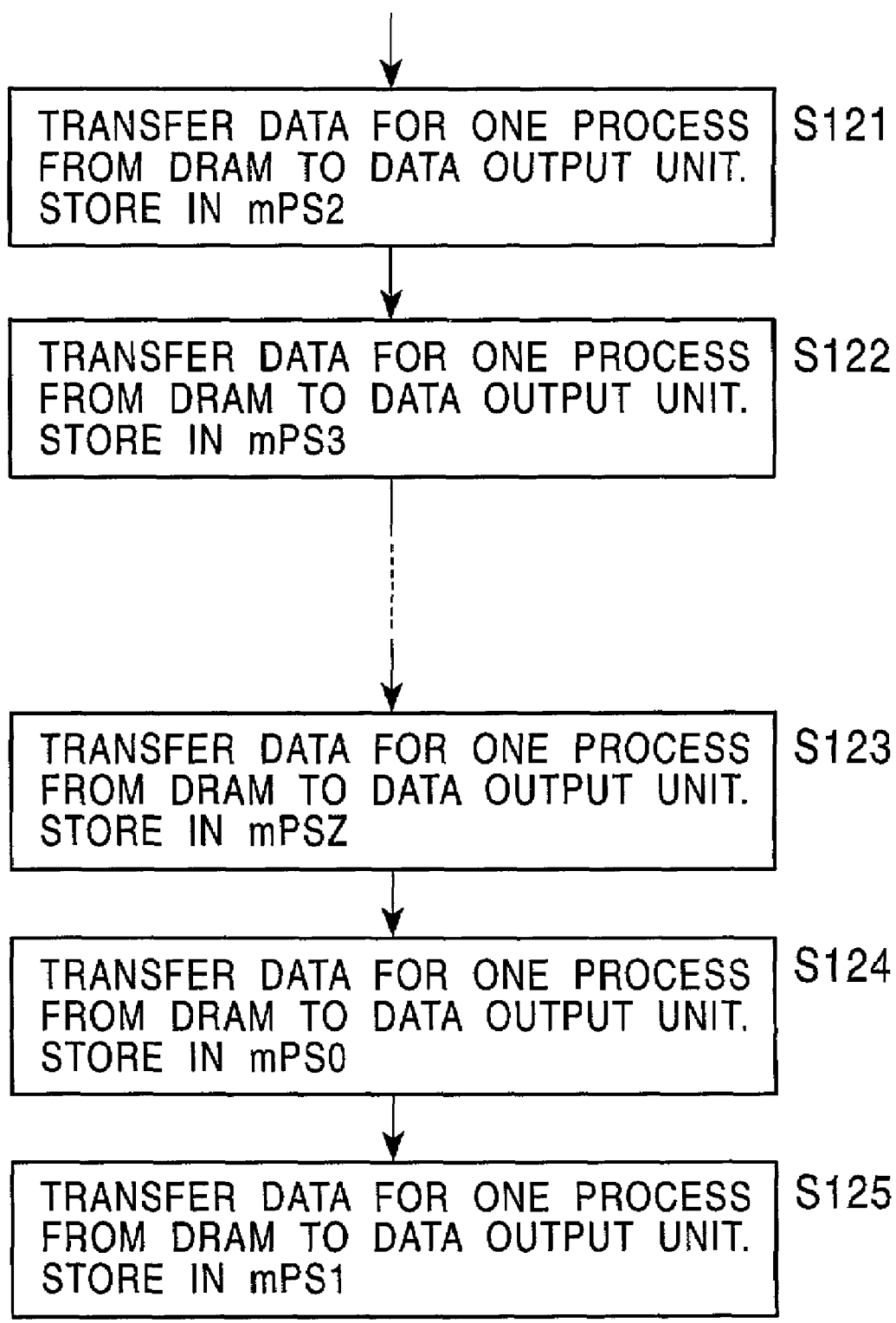

RECORDING AND/OR PLAYBACK APPARATUS AND METHOD

BACKGROUND OF THE INVENTION

1. Field of the Invention

The present invention relates generally to recording and/or playback apparatuses and methods suitable for a music server in which numerous music data are stored in a hard disk drive thereof and, more particularly, relates to a recording and/or playback apparatus and a method in which the stored data are protected even when the hard disk drive is changed.

2. Description of the Related Art

Music servers in which numerous music data are stored in a hard disk drive thereof have been proposed. Because of the fast access speed and large storage capacity of the hard disk drive, the numerous music data can be efficiently managed therein. A user selects desired music data from among those stored in the music server, and then the music server sends the selected desired music data to a portable recording/playback apparatus, whereby the selected desired music data can be easily played back at a place remote from the music server.

When the music data is stored on the hard disk drive, there is a possibility that the copyright of the music data may be violated due to illegal duplication of the music data. In order to prevent copyright violation due to illegal duplication, for example, the SCMS (Serial Copy Management System) may be adopted. SCMS prevents digital duplication beyond one generation when data is duplicated from one digital apparatus to another digital apparatus.

Input/output interfaces for hard disk drives are standardized, and the formats of file systems are generally standardized as well. Therefore, even though SCMS is adopted, when the hard disk drive is changed, the music data can be illegally duplicated.

As input/output interfaces of the hard disk drives used in digital apparatuses, IDE (Integrated Device Electronics) and SCSI (Small Computer System Interface) are standards and are widely used. The formats of file systems such as the DOS (Disk Operating System) file system and the UNIX file systems are generally standardized. Therefore, a hard disk drive which is connected to one digital apparatus and which has data stored therein using the digital apparatus can be removed from the digital apparatus, and then the hard disk drive can be connected to another digital apparatus, whereby the data can be exchanged between these two digital apparatus.

As long as music data is output via a regular digital audio output, SCMS prevents duplication of the data from being performed beyond one generation. However, when music data is output without using such a regular digital audio output, that is, when, as described above, the hard disk drive in one digital apparatus is changed to be connected to another digital apparatus, and the music data in the hard disk drive are duplicated to a storage media connected to the other digital device, SCMS cannot prevent this duplication. Accordingly, to deal with the above case, devices such as one disabling data to be read by digital apparatuses other than the original digital apparatus or one enabling data to become meaningless to the other digital apparatuses must be considered.

Recently, advanced cryptographic algorithms have been designed, and so-called cipher LSIs (large-scale integrated circuit) performing encryption or decryption on a signal have been developed. However, mounting of such a cipher LSI leads to high cost and is often inappropriate for civilian use. Protection of the copyright is desired without using so-called a cipher LSI and by applying a method which is as simple as possible.

SUMMARY OF THE INVENTION

Accordingly, it is an object of the present invention to provide a recording and/or playback apparatus and a method which protect copyrighted data such as music data stored on a hard disk drive even when the hard disk drive is changed.

To this end, according to a first aspect of the invention, there is provided a recording and/or playback apparatus comprising a first storage medium having a management region and a data region, an initializing device for initializing the first storage medium so that the first storage medium comprises the management region and the data region, a generating device for generating a predetermined value when the initialization is performed, a second storage medium storing the predetermined value therein, a transforming device for applying a transformation to the predetermined value so as to be a different value, and a control device for controlling the output of the transforming device so as to store the output in the management region.

The recording and/or playback apparatus may further comprise a first reading device for reading the output of the transforming device stored in the management region at a time when the power is supplied and when the first storage medium is accessed, an inverse-transforming device for applying an inverse-transformation to the output of the transforming device, the second reading device for reading the predetermined value stored in the second storage medium, a comparing device for comparing the output of the inverse-transforming device and the predetermined value read by the second reading device, and an authenticating device for performing authentication based on the output of the comparing device.

According to a second aspect of the invention, a recording and/or playback apparatus comprises a first storage medium including a management region and a data region, a searching device for searching for an unused region of the first storage medium based on information of the management region, a logical-link forming device for forming logical links in turn based on an entry cluster number corresponding to the unused region, a transforming device for applying a transformation to the entry cluster number, and a control device for controlling the output of the transforming device and the logical links so as to store the output of the transforming device and the logical links in the management region.

The recording and/or playback apparatus according to the present invention may further comprise a first reading device for reading the output of the transforming device and the logical links from the management region, an inverse-transforming device for applying an inverse-transformation to the output of the transforming device read by the first reading device, and a second reading device for reading data in accordance with the logical links by setting the cluster number corresponding to the output of the inverse-transforming device as the entry cluster number.

According to a third aspect of the invention, a recording and/or playback apparatus comprises a first storage medium including a management region and a data region, a receiving device for receiving data from an external source, a generating device for generating a predetermined value, a transforming device for applying a transformation to the predetermined value so as to be a different value, a second storage medium for storing the output of the transforming device therein, and a first control device for controlling data to be sorted in a manner corresponding to the predetermined value, received in units of blocks by the receiving device, transferred to the first storage medium, and stored therein.

The recording and/or playback apparatus may further comprise a sending device for sending data, a first reading device for reading the output of the transforming device stored in the second storage medium, an inverse-transforming device for applying an inverse-transformation to the output of the transforming device, and a second control device for controlling the data to be sorted in a manner corresponding to the output of the inverse-transforming device, the data being stored in units of blocks in the first storage medium, so as to be read and so as to be sent by the sending device.

According to a fourth aspect of the invention, a recording and/or playback apparatus comprises a receiving device for receiving data from an external source, a generating device for generating a predetermined value, a transforming device for applying a transformation to the predetermined value so as to be a different value, a storage medium for storing the output of the transforming device therein, and a first control device for controlling a block of the data to be sorted in a manner corresponding to the predetermined value, received in process units by the receiving device, transferred to the storage medium, and stored therein.

The recording and/or playback apparatus may further comprise a sending device for sending data, a first reading device for reading the output of the transforming device stored in the storage medium, an inverse-transforming device for applying an inverse-transformation to the output of the transforming device, and a second control device for controlling the block of the data to be sorted in a manner corresponding to the output of the inverse-transforming device, the block of data being stored in processing units in the storage medium, so as to be read and so as to be sent by the sending device.

According to a fifth aspect of the invention, a recording and/or playback method comprises the steps of initializing a first storage medium so as to have a management region and a data region, generating a predetermined value when the initialization is performed, storing the predetermined value in a second storage medium and transforming the predetermined value so as to be a different value, and controlling the transformed predetermined value so as to be stored in the management region.

The recording and/or playback method may further comprise the steps of reading, at one time of when the power is supplied and when the first storage medium is accessed, the transformed predetermined value stored in the management region, applying an inverse-transformation of the transformation to the transformed predetermined value, reading the predetermined value stored in the second storage medium, comparing the inverse-transformed transformed predetermined value and the predetermined value read from the second storage medium, and performing authentication based on the result of the comparing step.

According to a sixth aspect of the invention, a recording and/or playback method comprises the steps of providing a first storage medium including a management region and a data region, searching for an unused region based on information stored in the management region of the first storage medium, forming logical links in turn based on an entry cluster number corresponding to the unused region, applying a transformation to the entry cluster number, and controlling the transformed entry cluster number and the logical links so as to be stored in the management region.

The recording and/or playback method may further comprise the steps of reading the transformed entry cluster number and the logical links from the management region, applying an inverse-transformation of the transformation to the transformed entry cluster number read from the management region, and reading the data based on the logical links by setting the inverse-transformed transformed entry cluster number as the entry cluster number.

According to a seventh aspect of the invention, a recording and/or playback method comprises the steps of providing a first storage medium including a management region and a data region, generating a predetermined value, applying a transformation to the predetermined value so as to be a different value, storing the transformed predetermined value in a second storage medium, receiving data from an external source, and controlling the data so as to be sorted in a manner corresponding to the predetermined value, received in units of blocks, transferred to the first storage medium, and stored therein.

The recording and/or playback method may further comprise the steps of reading the transformed predetermined value stored in the second storage medium, applying an inverse-transformation of the transformation to the transformed predetermined value, and controlling the data so as to be sorted in a manner corresponding to the inverse-transformed transformed predetermined value, the data being stored in units of blocks in the first storage medium, read, and sent.

According to an eighth aspect of the invention, a recording and/or playback method comprises the steps of generating a predetermined value, applying a transformation to the predetermined value so as to be a different value, storing the transformed predetermined value in a storage medium, receiving data from an external source, and controlling a data block so as to be sorted in a manner corresponding to the predetermined value, received in processing units, transferred to the storage medium, and stored therein.

The recording and/or playback method may further comprise the steps of reading the transformed predetermined value stored in the storage medium applying an inverse-transformation to the transformed predetermined value, and controlling the data block so as to be sorted in a manner corresponding to the inverse-transformed predetermined value, the data block being stored in processing units in the storage medium, read, and sent.

According to this invention, when the hard disk drive is initialized, an identity authentication parameter is transformed and is stored. When the power is supplied or when the hard disk drive is accessed, the transformed authentication parameter is inverse-transformed into the original identity authentication parameter, and then the authentication of the parameter is performed. Therefore, it can be determined whether the hard disk drive is changed.

According to this invention, since a file access parameter for a file entry is transformed, when the file is desired to be accessed, the file entry cluster of the desired file cannot be accessed unless the file access parameter is correctly inverse-transformed. Therefore, when the hard disk drive is changed, file access is denied.

According to this invention, a block transfer parameter is transformed and is stored in a flash PAM. By sorting blocks of the data in accordance with the block transfer parameter when the data is transferred, data transfer can be correctly performed only in a case in which the hard disk drive is connected to the same apparatus as the one which was connected to the hard disk drive when the data was stored.

According to this invention, an in-block transfer parameter is transformed and is stored in a DRAM. By sorting in-block data in accordance with the in-block transfer parameter when the in-block data is transferred, data transfer can be correctly performed only in a case in which the hard disk drive was connected to the same apparatus as the one which was connected to the hard disk drive when the data was stored.

Therefore, even when the hard disk drive is changed, since data duplication can be prevented, copyrighted data stored in the hard disk drive can be protected.

BRIEF DESCRIPTION OF THE DRAWINGS

FIG. 7 is a flowchart of a copy protection method of initializing an identity authentication system;

FIG. 8 is a flowchart of the copy protection method of accessing an identity authentication system;

FIG. 10 is a diagram showing a recording format of the hard disk;

FIG. 23 is a flowchart of the copy protection method using sorting of transferred in-block data.

DESCRIPTION OF THE PREFERRED EMBODIMENTS

Embodiments of the present invention are described below with reference to the drawings.

1. Outline of Music Server

Figure 1:
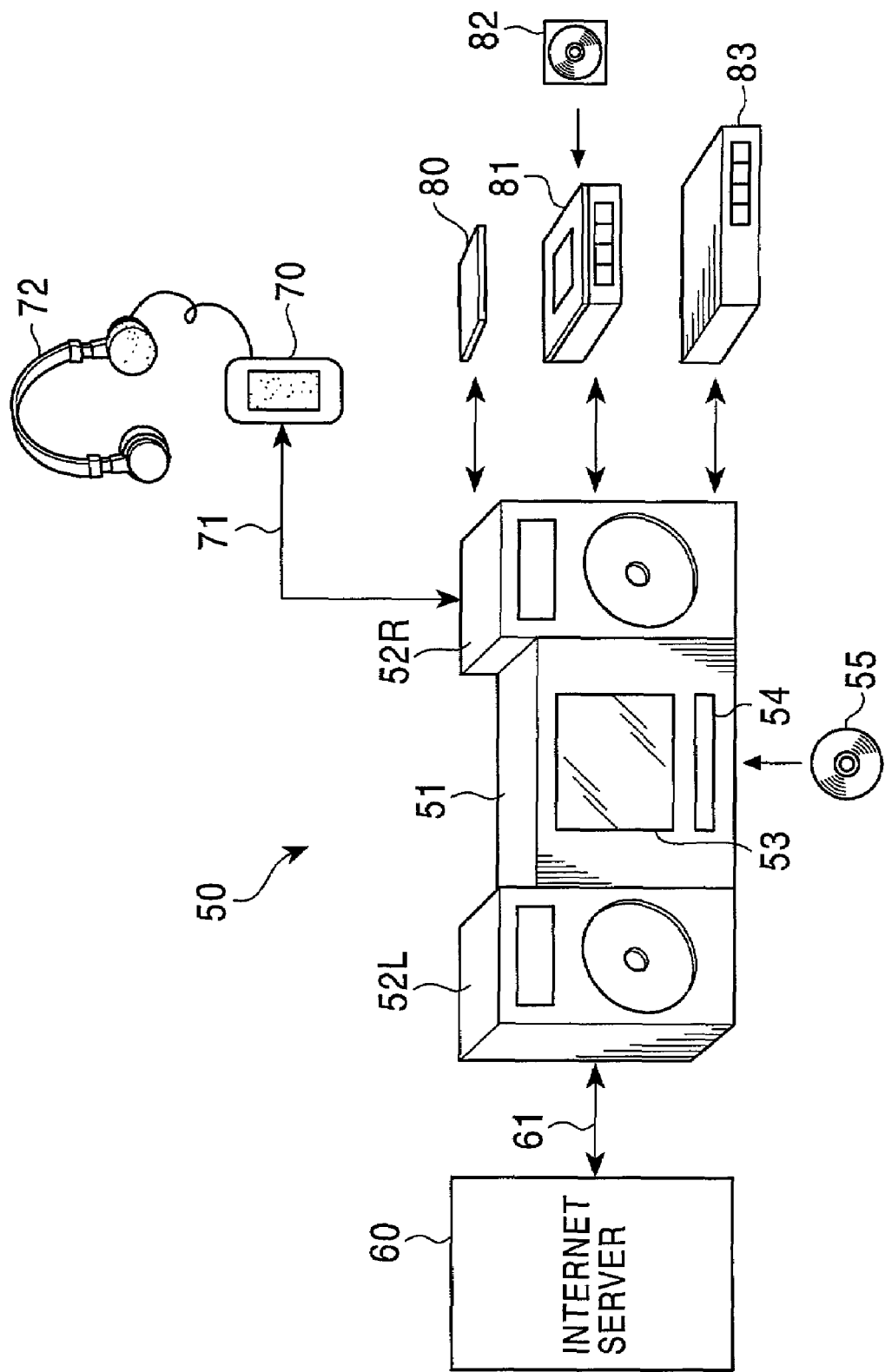
FIG. 1 is a diagram showing a music server according to the present invention and a system using the same.

FIG. 1 shows a music server 50, to which the present invention is applied, and a system using the music server 50. The music server 50 includes a server 51, a left speaker unit 52L, and a right speaker unit 52R. The server 51 is provided with a display unit 53 having, for example, an LCD (liquid crystal display) panel therein, and a CD (compact disk) loading unit 54 for a CD to be loaded in the server 51.

A console (not shown) having a plurality of operation switches for operating the server 51 is provided in the server 51. The server 51 may be provided with, for example, an infrared signal reception unit receiving an infrared signal for remote-controlling the server 51 by means of a remote-controller. The server 51 includes a controller which controls various actions in accordance with predetermined programs pre-stored in a ROM (read only memory).

When a user loads a CD 55 via the CD loading unit 54 into the server 51 and performs predetermined operations on the console, data is read from the CD 55 and is played back via the speaker units 52L and 52R. When the CD 55 includes text data, such as the titles of songs, the titles of songs are displayed on the display unit 53.

The music server 50 includes a mass storage medium, such as a hard disk drive. By performing predetermined operations on the console, the data read from the CD 55 loaded in the server 51 can be stored in the storage medium such as the hard disk. When the data is intended to be stored, the user can select from among recording options such as normal-speed recording in which the data is stored at the same transfer speed as the normal reading speed of the CD 55 and high-speed recording in which the data is stored at a higher transfer speed than the normal reading speed of the CD 55. When the high-speed recording option is selected, an accounting processing is executed. After execution of the accounting processing, the CD 55 or a song recorded on the CD 55 is selected, and then the music data read from the CD 55 or the selected song can be stored at a higher transfer speed than the normal reading speed of the CD 55.

In the music server 50, the music data read from the CD 55 are compression-encoded using a predetermined method, such as ATRAC (adaptive transform acoustic coding), and then are stored as compressed music data. A hard disk having a capacity of 6 Gbytes can contain approximately 1000 songs, and a list of the songs stored in the hard disk is displayed on the display unit 53, so that the user can select and play back a desired song from among the songs stored in the hard disk based on the list displayed on the display unit 53. Because of random accessibility of the hard disk, a plurality of music data stored in the hard disk can be read in an arbitrary order and successively played back.

Various compression-encoding methods can be employed. In this embodiment, for example, as disclosed in U.S. Pat. No. 5,717,821, a method called "ATRAC 2" is employed. This is an advanced method of ATRAC, which is a compression-encoding method employed for the above-described portable recording/playback apparatus. In ATRAC 2, the music data is compression-encoded by taking advantage of a masking effect and frequency dependence of the minimum audible limit based on the characteristics of the sense of hearing and by combining transformation-encoding and entropy-encoding. By employing this method, fast encoding or decoding can be performed with a relatively small hardware configuration while the music data can still provide high-quality sound.

This music server 50 can be connected via a communication line 61, such as a public telephone line, to an external system, such as an internet server 60 connected to the internet. When the music server 50 accesses the internet server 60 via the communication line 61, various information on the internet can be obtained. For example, the internet server 60 has a database containing information about the titles of commercial music CDs. In order to access this database, the user is permitted to have an identity key for use of the database. When the user accesses the database, by performing a particular operation using the identity key, attribute information of CDs such as the title information of CDs can be obtained.

The internet server 60 executes the accounting processing for the music server 50 in accordance with the service provided to the user. When the above-described high-speed recording of the CD 55 is performed, the music server 50 requests permission from the internet server 60 to perform the high-speed recording. The internet server 60 executes the accounting processing for the user who requests high-speed recording for selection of a CD or a song, so that high-speed recording can be performed.

Here, although the accounting processing is executed on the internet server 60 in which a plurality of attribute information of CDs are stored, execution of the accounting processing is not necessarily limited to the above-described example. For example, the accounting processing may be executed on another server, which is also connected to the internet. Alternatively, the accounting processing may be executed via a private network other than the internet.

A portable recording/playback apparatus 70 includes a storage medium, such as a hard disk, or a flash memory. Any other storage medium may be used as long as the storage medium can keep up with the reading speed of music data. When this portable recording/playback apparatus 70 is connected to the music server 50 via a communication line 71, music data stored in the music server 50 is transferred to the portable recording/playback apparatus 70, and then can be stored on the storage medium of the portable recording/playback apparatus 70. At this time, the music server 50 sets the music data to a read-protect state though the music data, which is transferred to the portable recording/playback apparatus 70, is still stored in the storage medium of the music server 50. The storage medium used for the portable recording/playback apparatus 70 has a capacity of approximately 200 Mbytes and can contain music data for several tens of songs. Hereinafter, a storage cell or storage medium having a semiconductor memory, such as flash memory, and a disk storage medium, such as a hard disk, are considered as the storage medium.

In the above-described examples, the music server 50 and the portable recording/playback apparatus 70 are connected by the communication line 71. However, the music server 50 and the portable recording/playback apparatus 70 may be provided with corresponding interface units so as to exchange data therebetween by being directly linked to each other. Alternatively, other than an electrical link, data exchange can be performed by an infrared signal. For example, by providing the music server 50 and the portable recording/playback apparatus 70 with interfaces based on IrDA (Infrared Data Association), the music server 50 can transfer music data to the portable recording/playback apparatus 70 using an infrared signal.

By providing predetermined interfaces in the music server 50, data can be exchanged between the music server 50 and various media. For example, by providing the music server 50 with an interface corresponding to a PC card 80, music data transferred from the PC card 80 can be loaded in the music server 50, or the music data can be exchanged between the music server 50 and a personal computer. By providing the music server 50 with a serial digital interface using an optical cable or the like, another digital music data recording/playback apparatus such as a disk recorder 81 using a compact magneto-optical disc having a diameter of 64 mm can exchange music data with the music server 50. In this example, a disk cartridge 82 containing the compact magneto-optical disc is loaded in the disk recorder 81, and the music data read from the magneto-optical disc in the disk cartridge 82 is supplied to the music server 50. Likewise, the music server 50 may be provided with an interface, such as IEEE-1394, so as to be connected to a set-top box 83 for CATV (Cable Television), satellite broadcasts, or the like.

The PC card is a standard for card-type peripheral devices for a personal computer, which is co-established by PCM-CIA (Personal Computer Memory Card International Association) in the US and JEIDA (Japanese Electronic Industry Development Association) in Japan. IEEE-1394 is an interface standard which is specified by the Institute of Electrical and Electronic Engineers.

The music server 50 has a WWW (World Wide Web) browser as a built-in application. When the music server 50 accesses the internet server 60 via the communication line 61, the user searches various contents on the internet and these contents, which are written in, for example, HTML (Hypertext Markup Language), can be displayed on the display unit 53.

With the above construction, for example, the user can play back music data stored in the music server 50 from the speaker units 52L and 52R, or the user can play back music data read from the CD 55 loaded in the music server 50 via the CD loading unit 54.

When the CD 55 is loaded in the music server 50, the music server 50 communicates with the internet server 60, and then the title information and the like of the CD 55 can be automatically obtained via the communication line 61 from the internet server 60. The information obtained from the internet server 60 is stored in the music server 50 and the stored title information is displayed on the display unit 53 when necessary.

To be more specific, the music server 50 sends characteristic information of the user (hereinafter, referred to as user information) such as user ID data of the server 50 to the internet server 60. The internet server 60 executes verification processing and accounting processing based on the received user information. In addition, the music server 50 sends medium information of the desired CD 55, or the CD 55 to be currently read, to the internet server 60. Based on received medium information, the internet server 60 retrieves attribute information of the music data, such as the titles of the songs, the name of the artist, the name of the songwriter, the lyric, and the jacket image.

For example, the music server 50 sends TOC (Table Of Contents) information of the CD 55 as medium information to the internet server 60. A database, in which attribute information of the music data can be retrieved based on TOC information, is constructed in the internet server 60. The attribute information may be obtained by causing the internet server 60 to retrieve it from another WWW server on the internet. When the internet server 60 receives the TOC information as medium information, it may retrieve attribute information of the music data. For example, the internet server 60 retrieves attribute information based on playing time information of the songs of the CD 55 contained in the TOC information.

The internet server 60 sends the retrieved attribute information to the music server 50. In the music server 50, the received attribute information is displayed on the display unit 53 while a CPU 8 (see FIG. 2) of the music server 50 stores the received attribute information as well as the TOC information of the CD 55, for example, on the hard disk drive. When the internet server 60 sends an HTML file having the retrieved attribute information embedded therein to the music server 50, the attribute information can be shown using the built-in WWW browser software.

When the attribute information contains another URL (Uniform Resource Locator) on the internet, the music server 50 can access a homepage represented by the URL.

Furthermore, by communicating data with the internet server 60, the music server 50 can store music data of the CD 55 loaded in the music server 50 in the storage medium of the music server 50 at a higher speed than the normal reading speed of the CD 55. For example, the music data of the CD 55 can be stored in approximately two minutes. When the music server 50 does not communicate with the internet server 60, the music data is stored at the standard reading speed of the CD 55, that is, the normal reading speed.

When the music server 50 is connected to the portable reading/playback apparatus 70 via the communication line 71, the music data stored on the music server 50 can be transferred to the portable reading/playback apparatus 70. The transferred music data can be read regardless of the connection between the portable reading/playback apparatus 70 and the music server 50, and the read music data can be played back via headphones 72.

2. Configuration of Music Server

Figure 2:
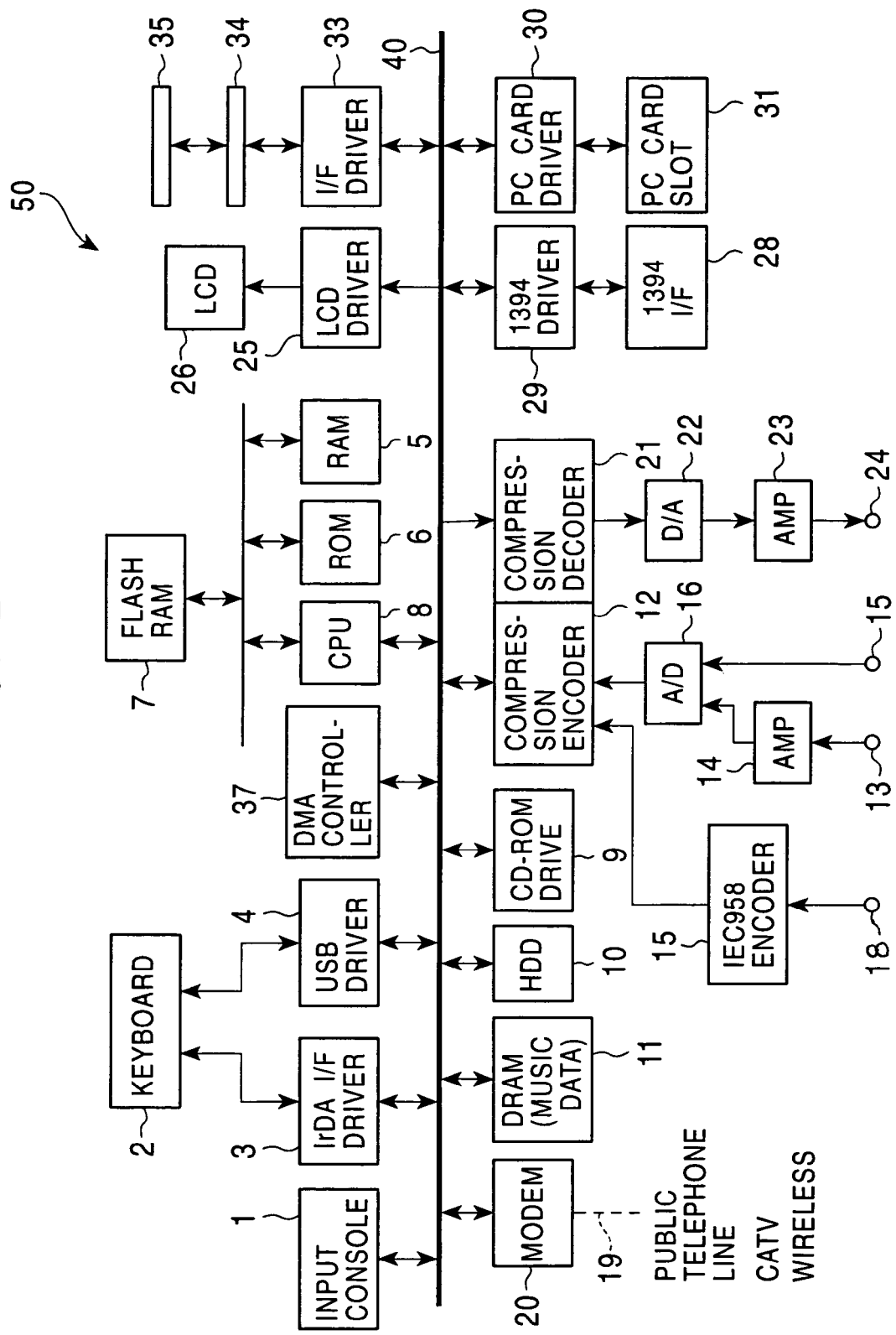
FIG. 2 is a block diagram of one configuration of the music server.

FIG. 2 shows one configuration of the music server 50. In the same manner as the configuration of a standard personal computer, the music server 50 includes a RAM (random access memory) 5, a ROM (read only memory) 6, a flash RAM 7, and the CPU 8, which are interconnected. A bus 40 is connected to the CPU 8, and the CPU 8 serves as a controller that controls actions of the entire music server 50.

A program for controlling actions of the music server 50 is pre-stored in the ROM 6. The music server 50 causes the CPU 8 to perform an action in accordance with an operation of an input console 1 based on the pre-stored program. In the RAM 5 and the flash RAM 7, a data region and a task region are temporarily allocated during execution of the program. The ROM 6 has a program loader stored therein and the program loader enables a program to be loaded in the flash RAM 7.

The input console 1 includes, for example, a plurality of push or rotary operation keys and switches operated by the corresponding operation keys. The input console 1 may include a so-called "jog dial" (rotary/push operation member), touch panels on an LCD (Liquid Crystal Display), or mechanical switching mechanism that responds by being pressed. A signal generated in response to an operation of the input console 1 is supplied to the CPU 8 via the bus 40. In accordance with the signal from the input console 1, the CPU 8 generates a control signal for controlling an action of the music server 50.

The bus 40 is connected to an infrared interface (IrDA I/F) driver 3 and/or a USB (Universal Serial Bus) driver 4. A keyboard 2 is provided so as to be connectable to or so as to communicate with these drivers 3 and 4. By using the keyboard 2, for example, the title of a song, the name of an artist, or the like corresponding to the music data can be easily input. The infrared interface driver 3 or the USB driver 4 may be configured to have data pass therethrough. Alternatively, the infrared interface driver 3 and the USB driver 4 may be omitted.

A CD-ROM drive 9 is connected to the bus 40 and is provided with the CD loading unit 54 in which the CD 55 is to be loaded. The CD-ROM drive 9 reads music data from the CD 55 loaded therein at the normal reading speed and, furthermore, it can read music data from the CD 55 at, for example, 16× or 32× speed.

The CD-ROM drive 9 may be provided so as to handle another disk storage medium containing music data, such as a magneto-optical disc, or DVD (Digital Versatile Disc), which is a trademark. Alternatively, a drive capable of handling a memory card is provided. Moreover, not only music data but also image data, text data, or program data may be read from the CD-ROM drive 9.

A hard disk drive, hereinafter referred to as HDD, 10 is connected to the bus 40. Music data read from the CD-ROM drive 9 is stored on the HDD 10. As a preprocess for storing music data on the HDD 10, the music data read from the CD-ROM drive 9 is supplied via the bus 40 and the DRAM (Dynamic Random Access Memory) for audio data 11 to a compression encoder 12.

The compression encoder 12 performs compression encoding on music data using, for example, the compression method disclosed in U.S. Pat. No. 5,717,821. For selection of compression speeds of the music data by the compression encoder 12, two encoding speed options, which are a high-speed mode and a low-speed mode, are available based on the control of the CPU 8. The low-speed compression speed corresponds to the normal reading speed that the CD-ROM drive 9 provides for the CD 55. The compression speed may be varied in accordance with, for example, the reading speed of the CD 55 provided by the CD-ROM drive 9. The compression encoder 12 may, for example, employ an encoding method in accordance with the compression speed.

The compression speed of the compression encoder 12 is not necessarily varied in the above-described way. For example, variation of the compression speed of the compression encoder 12 may be performed by changing a clock frequency, or may be performed by discrete encoding sections provided for the corresponding compression speed. In the compression encoder 12 capable of performing fast compression-encoding, low-speed compression encoding may be accomplished by reducing its processing speed so that the compression encoder 12 can be adjusted to the low-speed encoding.

The compressed music data, which is compression-encoded by the compression encoder 12, is stored on the HDD 10 via the DRAM 11.

Although the compressed music data, which is compression-encoded by the compression encoder 12, is constructed so as to be stored on the HDD 10, the music data read from the CD-ROM drive 9 may be arranged to be directly supplied to the HDD 10.

An audio signal input via an amplifier 14 from a microphone connected to a microphone terminal 13 or input from a line-in terminal 15 is supplied via an A/D converter 16 to the compression encoder 12 in which the audio signal can be compression-encoded for storing in the HDD 10. Furthermore, an optical signal is supplied via an IEC958 (International Electrotechnical Commission 958) encoder 18 from a digital optical input 17 to the compression encoder 12 in which the audio signal input as the digital optical signal can be compression-encoded for storing on the HDD 10.

Although, in this embodiment, the compression encoder 12 employs the encoding method, for example, as disclosed in U.S. Pat. No. 5,717,821, another encoding method, such as MPEG (Moving Picture Coding Experts Group), PASC (Precision Adaptive Sub-band Coding), TwinVQ (trademark), RealAudio (trademark), or LiquidAudio (trademark), may be employed.

A modem 20 is connected to the bus 40. The modem 20 is connected to an external network 19 such as a public telephone line, CATV, or a wireless communication. The music server 50 communicates via the external network 19 using the modem 20.

When the music server 50 is connected via the external network 19, for example, to the internet, the music server 50 and the internet server 60 on a remote site communicate with each other. The music server 50 sends various information, to the internet server 60, such as a request signal, medium information related to the CD 55 loaded in the CD-ROM drive 9, user ID data and user information assigned to the music server 50, accounting information for the user, and the like.

When various information, such as medium information and the user information, is sent to the internet server 60, the internet server 60 executes the verification processing and the accounting processing in accordance with the received user information, retrieves the attribute information of the music data in accordance with the received medium information, and sends the attributed data to the music server 50.

In this embodiment, although there is shown the example in which the attribute information of the music data is supplied to the music server 50, the music data as such may be directly supplied to the music server 50 in accordance with the request of the user. This means that the user can download the music data via the music server 50 from the internet server 60. The music data can be downloaded in accordance with the medium information. This allows, for example, a predetermined bonus track of the CD 55 to be obtained by downloading.

When the compressed music data, which is compression-encoded by the compression encoder 12 and which is stored on the HDD 10, is read from the HDD 10 for playback, the read data is supplied via the bus 40 to a compression decoder 21. The compression decoder 21 decodes the compressed music data. The decoded data is output via a D/A converter 22, an amplifier 23, and a speaker terminal 24 to the speaker units 52L and 52R in which the music data can be played back. Although not shown in FIG. 2, two channels corresponding to stereo output are provided from the D/A converter 22 to the speaker terminal 24 via the amplifier 23. Likewise, two channels of the speaker terminal 24 corresponding to the L-channel and the R-channel of stereo output are provided.

The compression decoder 21 employs a decoding method that corresponds to the encoding method employed by the compression encoder 12. Without using particular hardware, the compression encoder 12 and the compression decoder 21 may be implemented in software using the CPU 8.

A liquid crystal display element (hereinafter, referred to as LCD) 26, which constitutes the display unit 53, is connected to the bus 40 via an LCD driver 25. The CPU 8 supplies a drawing control signal to the LCD driver 25 via the bus 40. The supplied drawing control signal causes the LCD driver 25 to drive the LCD 26 to show a predetermined display on the display unit 53.

For example, an operation menu of the music server 50 or a title list of the compressed music data stored on the HDD 10 is displayed on the display unit 53. Since data based on the decoded attribute information sent from the internet server 60 is supplied to the HDD 10, the title list is displayed on the display unit 53 using the data based on the decoded attribute information stored on the HDD 10. Furthermore, for example, a folder or jacket image data corresponding to the music data which is selected to be played back is displayed on the LCD 26 based on the attribute information sent from the internet server 60.

When the user operates a pointing device of the input console 1 or the keyboard 2 based on what is displayed on the display unit 53, the CPU 8 controls reading of the selected music data. In addition, based on what is displayed on the display unit 53, the selected music data may be deleted, or may be copied onto or moved to an external apparatus. For example, when the input console 1 includes a touch panel provided on the LCD 26, and the user touches the touch panel in accordance with what is displayed on the display unit 53, the music server 50 can be operated. Thus, the display unit 53 serves as an interface between the user and the music server 50, whereby the music data stored on the HDD 10 can be managed and controlled.

In this example, IEEE-1394 and the PC card are used as interfaces between the music server 50 and general external information devices. An IEEE-1394 interface 28 is connected via an IEEE-1394 driver 29 to the bus 40. Likewise, a PC card slot 31 is connected via a PC card driver 30 to the bus 40.

The IEEE-1394 interface 28 enables data to be exchanged between the music server 50 and, for example, a personal computer. Furthermore, the IEEE-1394 interface 28 enables music data to be obtained from a satellite broadcasting IRD (Integrated Receiver/Decoder), a compact magneto-optical disc or an optical disc having a diameter of approximately 64 mm, DVD, a digital video tape, or the like. By loading a PC card into the PC card slot 31, the music server 50 can be easily expanded for various peripheral devices, such as an external storage device, another external media drive, a modem, a terminal adapter, a capture board, or the like.

An interface 34 is provided for exchanging music data between the music server 50 and a corresponding other recording/playback apparatus. As the corresponding other recording/playback apparatus, for example, the portable recording/playback apparatus 70 may be used. Alternatively, another music server 50 may be used as the corresponding other recording/playback apparatus.

The interface 34 is connected via an interface driver 33 to the bus 40. The corresponding other recording/playback apparatus is provided with an interface 35 that corresponds to the interface 34. When the interfaces 34 and 35 are electrically connected with a predetermined connection line 71, for example, the music data stored on the HDD 10 can be transferred from the music server 50 to the corresponding other recoding/playback apparatus.

Figure 3:
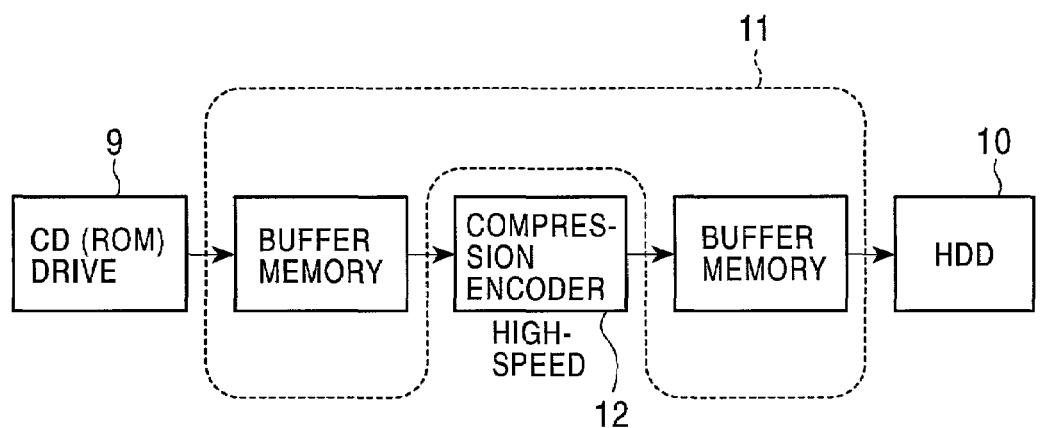
FIG. 3 is a block diagram showing a signal flow in which music data is read from a CD-ROM drive and is stored in a hard disk drive.

FIG. 3 shows a schematic signal flow from reading music data from the CD-ROM drive 9 to storing read music data on the HDD 10. The music data read from the CD-ROM drive 9 is transferred via the bus 40 to the DRAM 11. The DRAM 11 serves as a buffer memory in which the transferred data is temporarily stored. The music data read from the DRAM 11 at a predetermined timing is supplied via the bus 40 to the compression encoder 12. The compression encoder 12 encodes at a predetermined compression speed in accordance with the reading speed of the CD-ROM drive 9 as described above. The music data is compression-encoded by the compression encoder 12 and is again temporarily stored in the DRAM 11, which serves as the buffer memory. The compressed music data read from the DRAM 11 at a predetermined timing is supplied via the bus 40 to the HDD 10 in which the compressed music data is stored. At this time, as described above, the music server 50 receives the attribute information of the CD 55 currently read from the CD-ROM drive 9 from the internet server 60, stores the attribute information in the HDD 10, and forms this attribute information and the compressed music data into one data block. The CPU 8 controls the compressed music data and the attribute information as one data block.

Figure 4:
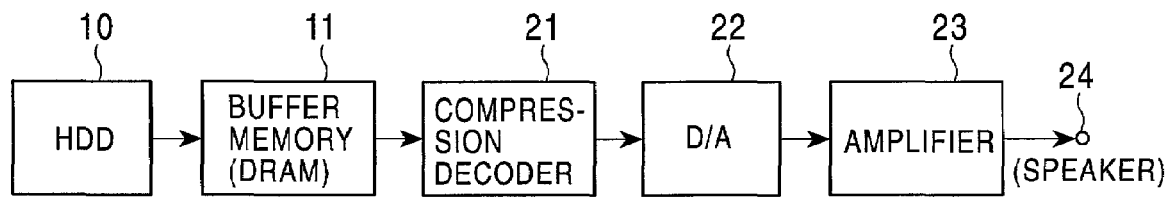
FIG. 4 is a block diagram showing a signal flow in which compressed music data is read from the hard disk drive, is decompressed, and is output to a speaker terminal.

FIG. 4 shows a schematic signal flow from reading of compressed music data from the HDD 10 to output of the music data to the speaker terminal 24. The compressed music data read from the HDD 10 is supplied via the bus 40 to the DRAM 11 and is temporarily stored in the DRAM 11 as the buffer memory. The compressed music data is read at a predetermined timing from the DRAM 11 and is supplied via the bus 40 to the compression decoder 21. The compression decoder 21 decodes the compressed music data to the original music data, and the decoded music data is supplied to the D/A converter 22. The D/A converter 22 converts the digital music data into an analog audio signal. The analog audio signal is amplified by the amplifier 23 and is output to the speaker terminal 24. When a speaker is connected to the speaker terminal 24, the music data is played back from the speaker. At the same time, the CPU 8 decodes the attribute information that is read from the HDD 10 along with the compressed music data, and the attribute information such as the title is displayed on the display unit 53.

3. One Example of Portable Recording/Playback Device

Figure 5:
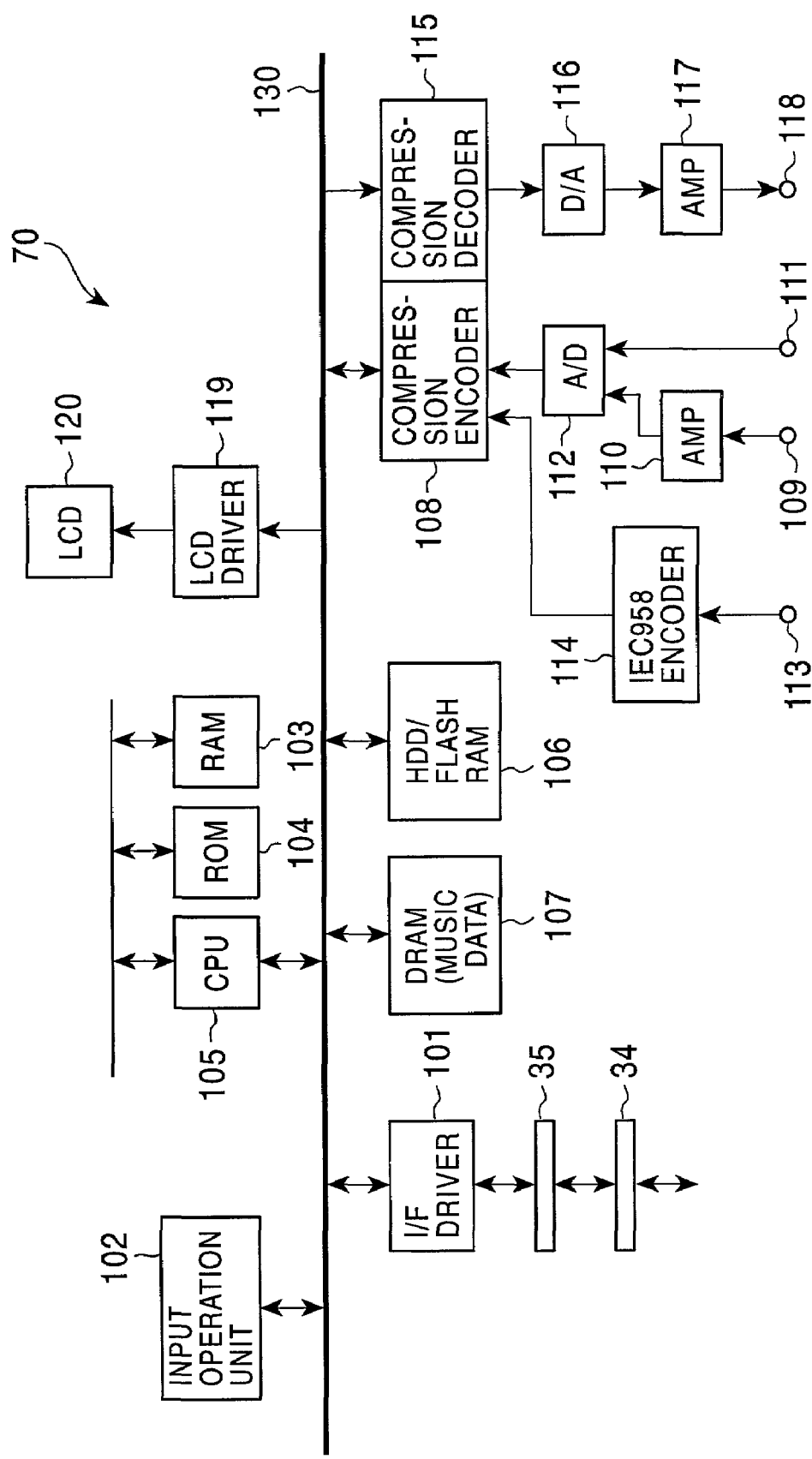
FIG. 5 is a block diagram of one configuration of a portable recording/playback apparatus.

FIG. 5 shows one configuration of the portable recording/playback apparatus 70, which serves as the corresponding other recording/playback apparatus. The configuration of the portable recording/playback apparatus 70 is substantially identical to that of the music server 50 shown in FIG. 2. The portable recording/playback apparatus 70 is normally separated from the music server 50 by detaching the interface 35 of the portable recording/playback apparatus 70 from the interface 34 of the music server 50 and is used as a single unit.

In the same manner as the configuration of a standard personal computer, the portable recording/playback apparatus 70 includes a RAM 103, a ROM 104, and a CPU 105, which are interconnected. In the same manner as the configuration of a standard personal computer, the portable recording/playback apparatus 70 may be provided with a flash RAM. The CPU 105 serves as a controller that controls actions of the portable recording/playback apparatus 70.

A program for controlling actions of the portable recording/playback apparatus 70 is pre-stored in the ROM 104. The portable recording/playback apparatus 70 causes the CPU 105 to perform an action in accordance with an operation of an input console 102 based on the pre-stored program. In the RAM 103, a data region and a task region are temporarily allocated during execution of the program. An input console 102 includes, for example, a plurality of push or rotary operation keys and switches operated by these corresponding operation keys. The input console 102 may include a jog dial, which is a rotary/push operation member, touch panels on an LCD, or mechanical switching mechanism that responds by being pressed. A signal generated in response to an operation of the input console 102 is supplied to the CPU 105 via a bus 130. In accordance with the signal from the input console 102, the CPU 105 generates a control signal for controlling an action of the portable recording/playback apparatus 70.

When the music server 50 reads desired music data from the HDD 10, and the music data is requested to be transferred to the portable recording/playback apparatus 70, it is transferred to the recording/playback apparatus 70 via the interfaces 34 and 35 and a connection line establishing a connection between the interface 34 and the interface 35. At the same time, along with the music data, the attribute information of the music data is also supplied to the portable recording/playback apparatus 70. When the music server 50 and the portable recording/playback apparatus 70 each have mounting parts corresponding to each other, since these mounting parts enable the interfaces 34 and 35 to be directly linked to each other, music data is transferred between the music server 50 and the portable recording/playback apparatus 70 without the connection line. In addition, when the portable recording/playback apparatus 70 and the music server 50 are each provided with interfaces using IrDA, music data is transferred using an infrared signal between the music server 50 and the portable recording/playback apparatus 70.

The music data transferred from the music server 50 to the other portable recording/playback apparatus 70 is supplied via an interface driver 101 and the bus 130 to an HDD 106, which serves as music data storage.

Alternatively, as the music data storage of the portable recording/playback apparatus 70, a flash RAM may be used. Other storage media such as a magneto-optical disk may be used as long as the storage medium can keep up with the reading speed of music data. In a case in which the music storage medium of the portable recording/playback apparatus 70 having a storage capacity of approximately 200 Mbytes is used, several tens of songs can be stored. The HDD 106 of the portable recording/playback apparatus 70 contains the music data sent from the music server 50 as well as the attribute information of the music data.

In this example, the music data, which is transferred from the music server 50 to the HDD 106 of the portable recording/playback apparatus 70, has already been compression-encoded in the music server 50. The portable recording/playback apparatus 70 may store non-compression-encoded music data in the HDD 106. For example, the music data read from the CD 55 loaded in the CD-ROM drive 9 of the music server 50 is supplied unmodified via the interface driver 101 to the portable recording/playback apparatus 70. However, when the uncompressed music data is supplied to the portable apparatus 70, the size of the music data which can be recorded in the portable apparatus 70 is considerably reduced.

As a preprocess for recording the music data in the HDD 106, the supplied music data is temporarily stored in a DRAM (for an audio signal) 107 which is connected to the bus 130. The music data read from the DRAM 107 is supplied via the bus 130 to a compression encoder 108. The compression encoder 108 performs compression encoding of the music data with an encoding method equivalent to that of the compression encoder 12 of the music server 50. The music data compressed by the compression encoder 108 is supplied to the DRAM 107 and is temporarily stored therein. Finally, the compressed music data temporarily stored in the DRAM 107 is read and is stored in the HDD 106.

In this example, an audio signal input via an amplifier 110 from a microphone connected to a microphone terminal 109 or an audio signal input from a line-in terminal 111 is supplied via an A/D converter 112 to the compression encoder 108. The compression encoder 108 can perform compression-encoding of the audio signal from the A/D converter 112 so that the compressed audio signal can be recorded in the HDD 106. In addition, a digital optical signal is supplied via an IEC-958 encoder 114 from a digital optical input terminal 113 to the compression encoder 108. The audio signal, which is input as the optical signal, is compression-encoded so that the compressed audio signal can be recorded in the HDD 106. In the case in which the portable apparatus 70 is dedicated for reading only compressed music data, the above A/D converter 112, encoder 108, and the like which are required for recording processing can be omitted.

When the compressed music data is read from the HDD 106 for reading, it is supplied via the bus 130 to a compression decoder 115. The compression decoder 115 decodes the compressed music data by performing decompression processing and the decompressed music data is output via a D/A converter 116 and an amplifier 117 to a speaker terminal 118. The speaker terminal 118 is connected to the headphones 72 with the music data can be listened to. Although not shown in FIG. 5, two channels corresponding to stereo output are provided from the D/A converter 116 to the speaker terminal 118 via the amplifier 117. Likewise, two channels of the speaker terminal corresponding to the L-channel and the R-channel of stereo output are provided.

An LCD 120 is connected via an LCD driver 119 to the bus 130. The CPU 105 supplies a drawing control signal via the bus 130 to the LCD driver 119. The supplied drawing control signal causes the LCD driver 119 to drive the LCD 120 to display a predetermined display on the LCD 120. An operation menu of the portable apparatus 70 or a title list of the music data stored in the HDD 106 is displayed on the LCD 120. For example, a folder or jacket image corresponding to the music data which is selected to be played back is displayed on the LCD 120 based on the attribute information stored in the HDD 106.

When a user operates a pointing device of the input console 102 based on what is displayed on the LCD 120, one of the compressed music data stored in the HDD 106 is selected and played back. In addition, based on what is displayed on the LCD 120, deletion, duplication, or moving of the selected music data may be performed. For example, by touching the touch panel of the input console 102 in accordance with what is displayed on the LCD 120, the user can operate the portable apparatus 70. Thus, the LCD 120 serves as an interface between the user and the portable apparatus 70, whereby the compressed music data stored on the HDD 106 can be managed or controlled for recording and playback.

The portable apparatus 70 is driven by a battery, not shown. Because of this, the portable apparatus is provided with a power supply unit, which utilizes a common secondary battery or a dry battery as a power supply source, and is also provided with a charging unit. When the music server 50 and the portable apparatus 70 are directly linked by the connection line or the mounting parts, and the music data is transferred, the music server 50 also supplies electrical power to the charging unit to charge the secondary battery of the portable apparatus 70. As the power supply, either the power source that uses the dry battery or the chargeable power source that uses the secondary battery may be used.

4. Protection Against Data Duplication Due to Identity Authentication

The above-described system can duplicate music data from the music server 50 to the portable apparatus 70, the disk recorder 81 connected to the music server 50, or the like. However, unconstrained duplication may lead to violation of the music data copyright. As a device for preventing the copyright from being violated due to illegal duplication, SCMS is known. In a case in which the HDD 10 is removed from the music server 50, the HDD 10 is connected to another apparatus, and music data stored on the HDD 10 is duplicated to a recording/playback apparatus connected to the other apparatus, illegal-copy protection fails because SCMS does not work in such a case. Accordingly, even when the hard disk is changed in the above-described manner, duplication must be restricted so that the copyrighted data is protected.

To solve the above problem, using a parameter obtained by means of a transformation employing a mapping intrinsic to an apparatus, the present invention prevents the copyrighted data from being duplicated even when the hard disk drive is changed.

An example is described in which changing of the hard disk drive is determined by means of authentication employing the mapping-transformed parameter.

As the interface of the HDD 10, a typical interface such as IDE (Integrated Device Electronics) or SCSI (Small Computer System Interface) may be used. Data is stored as a file in the HDD 10.

Figure 6:
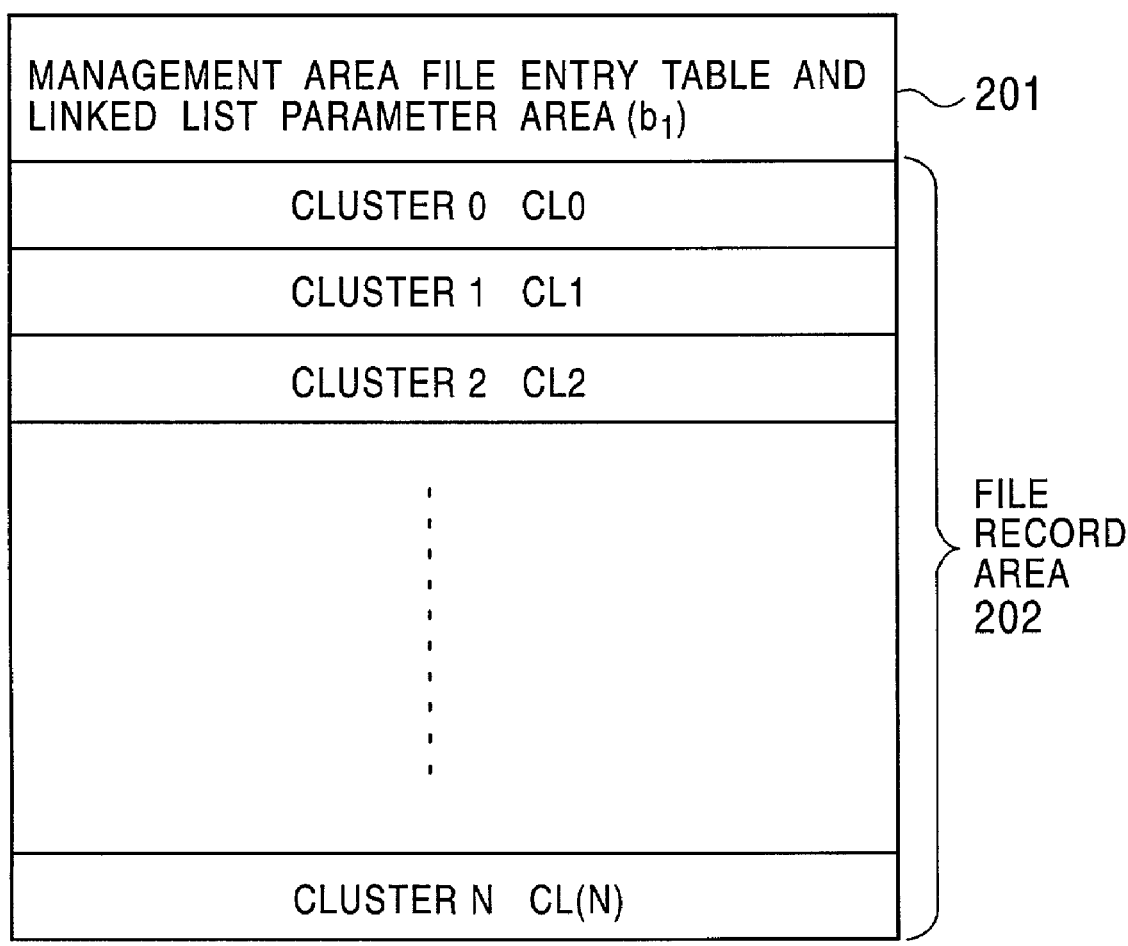
FIG. 6 is a diagram showing a recording format of the hard disk drive.

As shown in FIG. 6, a disk recording area of the HDD 10 includes a management area 201 and a file record area 202. The management area 201 includes a file entry table and a linked list. Furthermore, the management area 201 includes a parameter area.

The parameter provided in the management area 201 of the HDD 10 is an identity authentication parameter b1. When the power is supplied, the identity authentication parameter b1 serves to determine whether the HDD 10 is changed.

This identity authentication parameter b1 stored in the management area 201 is obtained by means of the transformation employing an authentication mapping f1 intrinsic to the apparatus, which in this case is the music server 50. This means that the identity authentication parameter b1 is obtained by transforming an actual parameter a1 (parameter for identity authentication) using the mapping f1 so that b1=f1(a1) holds.

In the ROM 6, a program for computation using the mapping f1 for transformation and for computation using an inverse mapping $f1^{-1}$ for inverse-transformation is stored. The above-described transformation from the actual parameter a1 to the identity authentication parameter b1 is performed in accordance with this program stored in the ROM 6. The inverse-transformation from the identity authentication parameter b1 to the actual parameter a1 is also performed in accordance with this program stored in the ROM 6.

The parameter a is an arbitrary value in the domain of an arbitrary mapping f for which an inverse mapping exists. The inverse mapping ($b=f^{-1}(a)$) of the parameter and the parameter b are in one-to-one correspondence. As described above, the mapping and inverse mapping computation program is stored in the ROM 6 and the mapping and inverse mapping are intrinsic to the apparatus. For example, f1=I (identity mapping $f1^{-1}=I$) may be set as the mapping f1.

FIGS. 7 and 8 show flowcharts of identity authentication processing. The HDD 10 must be initialized before being used. The initialization of the HDD 10 is performed before its shipment or its use by applying a HDD initialization command.

In this initialization process at step S11, normal initialization processing is executed. For example, the disk of the HDD 10 is divided into clusters, and each cluster is numbered. In the management area 201, the file entry table and the linked list are created, initialized, and so forth. As a result of executing the initialization processing, all data stored in the HDD 10 are deleted.

At step S12, the CPU 8 generates the actual parameter a1, which is the parameter for identity authentication. The parameter a1 is stored in an authentication parameter area of the flash RAM 7. At step S13, the computation program using the mapping f1 for transforming the parameter a1, the program being stored in the ROM 6, is activated. The computation program computes b1=f1(a1), thus obtaining the parameter b1 based on the parameter a1. At step S14, the transformed identity authentication parameter b1 is stored in a parameter area of the management area 201 of the HDD 10.

When the disk initializing processing of the HDD 10 is executed, the identity parameter b1 transformed using the mapping intrinsic to the apparatus is stored in the parameter area of the management area 201 of the HDD 10.

When the power is supplied or when the HDD 10 is accessed, the identity authentication is performed, which determines whether the HDD 10 is changed. When this identity authentication is performed, the parameter b1 is used.

FIG. 8 shows a flowchart of the identity authentication process which is executed when the power is supplied or when the HDD 10 is accessed. At step S21, the parameter b1 is read from the parameter area of the management area 201 of the HDD 10 when the power is supplied or when the HDD 10 is accessed. At step S22, the computation program using the inverse mapping $f1^{-1}$ for inverse-transforming the parameter b1, the program being stored in the ROM 6, is activated. The computation program computes $a1=f1^{-1}(b1)$, thus obtaining the parameter a1 based on the parameter b1.

At step S23, the identity authentication parameter a1 stored in the flash RAM 7 as shown at step S12 in FIG. 7 is read. At step S24, the parameter a1 obtained at step S22 and the parameter a1 obtained at step S23 are compared.

When the HDD 10 is not changed, both parameters a1 must be equal. If both parameters are equal, the process proceeds to step S25 in which the validity of the HDD 10 is verified, otherwise the process proceeds to step S26 in which the validity of the HDD 10 fails to be verified.

5. Protection Against Data Duplication Due to File Access Restricted

An example in which file access is denied when the HDD 10 is changed is described.

Figures 9A, 9B:
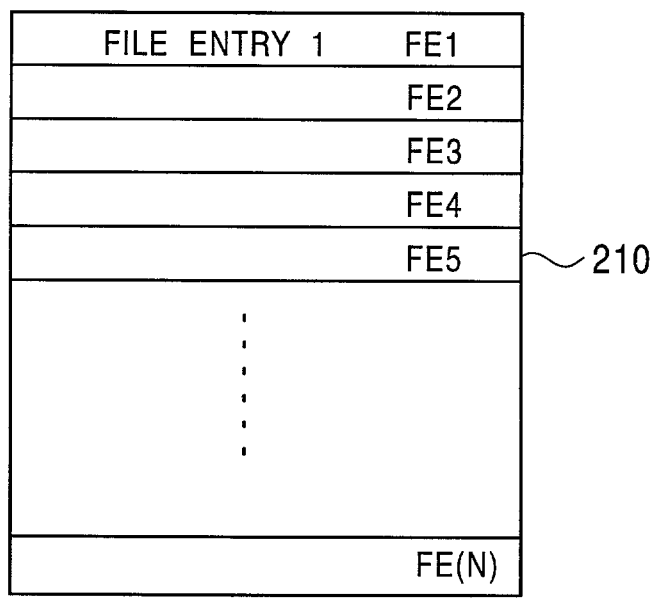
FIGS. 9A and 9B are diagrams showing recording formats of the hard disk.

As shown in FIG. 6, the disk recording area of the HDD 10 is divided into the management area 201 and the file record area 202, and the management area 201 is divided into a file entry table 210 and a linked list 220. As shown in FIG. 9A, the file entry table 210 contains the file entries of the files stored in the HDD 10. As shown in FIG. 9B, the file entry of each file contains a file name 211, a parameter field 212, a file size 213, creation time and modification time 214, and other attribute information 215.

As shown in FIG. 10, the linked list 220 shows correspondence relationships between cluster numbers CL0, CL1, . . . and their subsequent cluster numbers LCLO, LCL1, . . . . By traversing this linked list, a group of clusters is formed into a file. A unique number such as 0 is contained in the final cluster number of the file.

Figure 11:
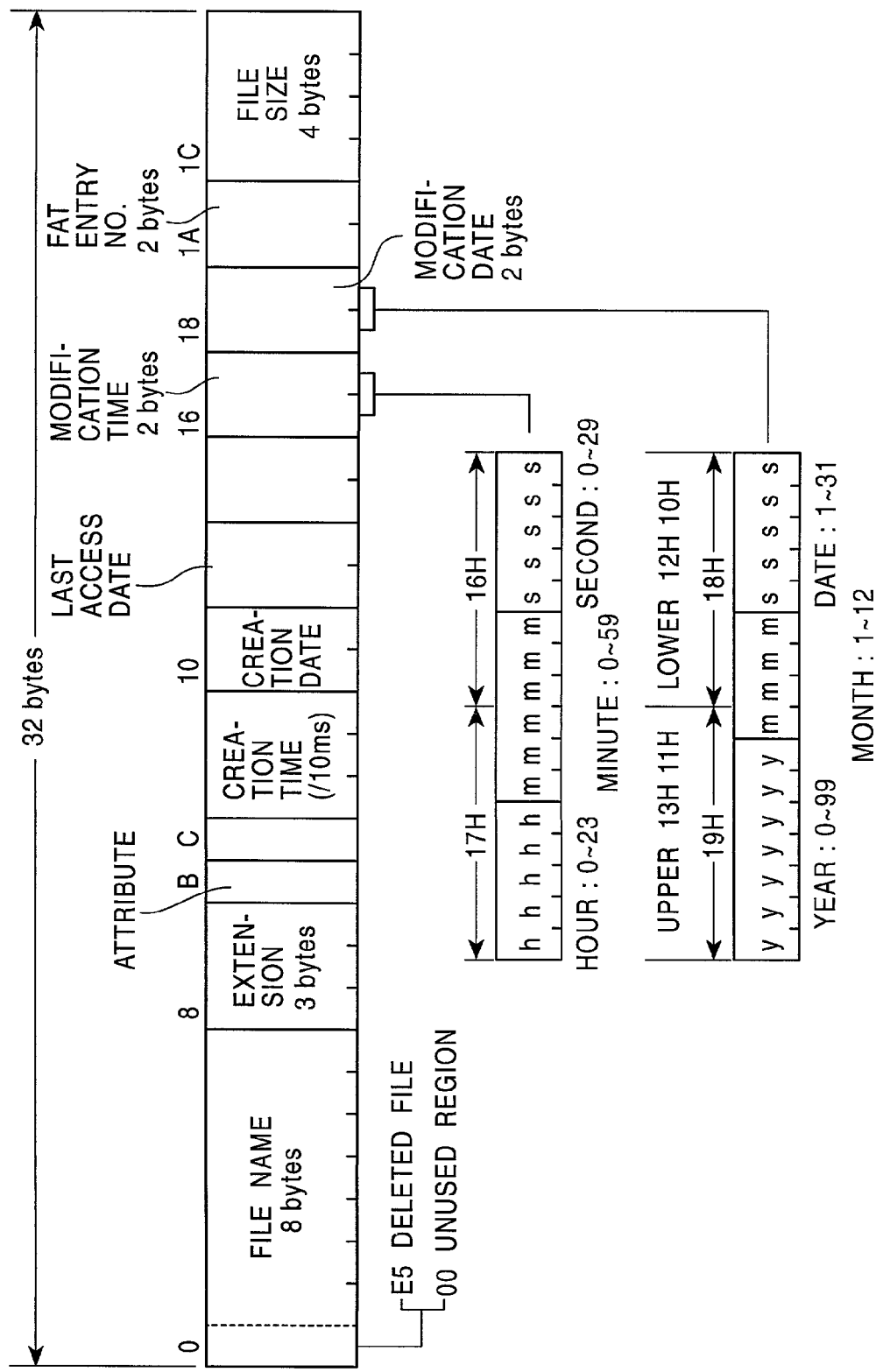
FIG. 11 is a diagram showing the DOS file format.

Such a file format structure is implemented in, for example, the DOS file format. In the DOS file format, the management area includes a directory region and FAT (File Allocation Table). As shown in FIG. 11, the directory region includes the file name, the extension thereof, the attribute, the creation time and date, the modification time and date, the FAT entry number, and the file size information. The FAT region includes link information of files, each of which consists of a set of clusters.

In the DOS file format, the entry cluster number of a file is obtained based on a FAT entry number of the directory region, and the FAT table shows the subsequent cluster numbers of the file. When a desired file is accessed, the entry cluster of the file is accessed based on the FAT entry number of the directory region, and then the subsequent clusters of the file are accessed based on the FAT table. Therefore, the directory region is the file entry table 210 and the FAT region is the linked list 220.

The parameter field 212 in FIG. 9B contains the value of a file access parameter b2. The file access parameter b2 represents the entry cluster number of the file, which corresponds to the FAT entry number in the DOS file format shown in FIG. 11. The file access parameter b2 is transformed using a mapping f2 intrinsic to the apparatus, that is, the parameter b2 is obtained using the mapping f2 of an actual parameter a2 as follows: b2=f2(a2). Because of this, as long as the parameter b2 is not correctly transformed into the original parameter a2, the access of the entry cluster of the desired file fails. When the HDD 10 is changed, because the parameter b2 cannot be correctly transformed into the parameter a2, the entry cluster of the desired file cannot be accessed.

As the mapping f2, for example, f2(z)=z+1 is given. In this case, as the inverse mapping of f2(z), the inverse mapping $f2^{-1}(z)=z-1$ is obtained. Preferably, the inverse mapping $f2^{-1}(z)$ is an identity mapping of the f2(z).

Figure 12:
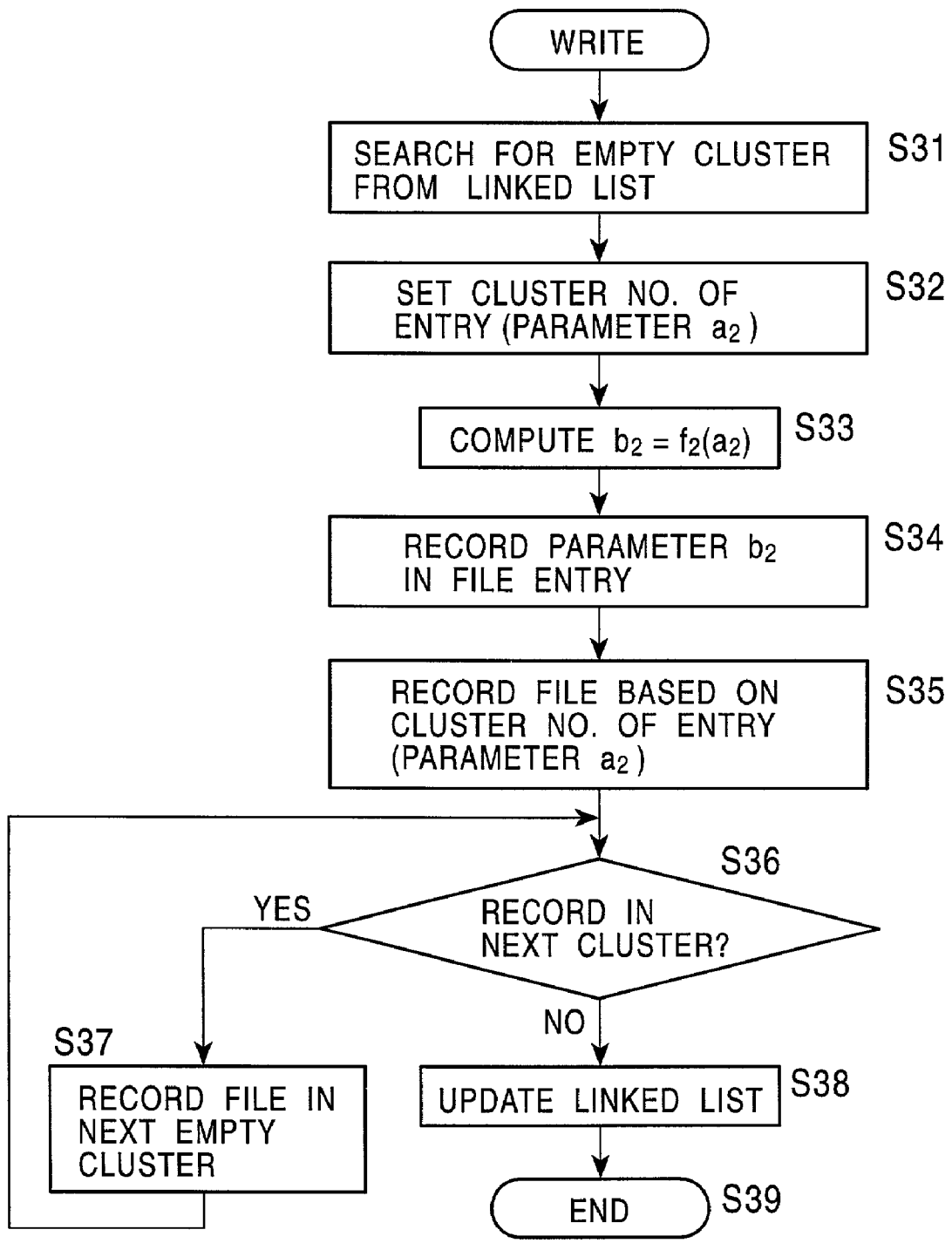
FIG. 12 is a flowchart of a copy protection method using file access restriction.
Figure 13:
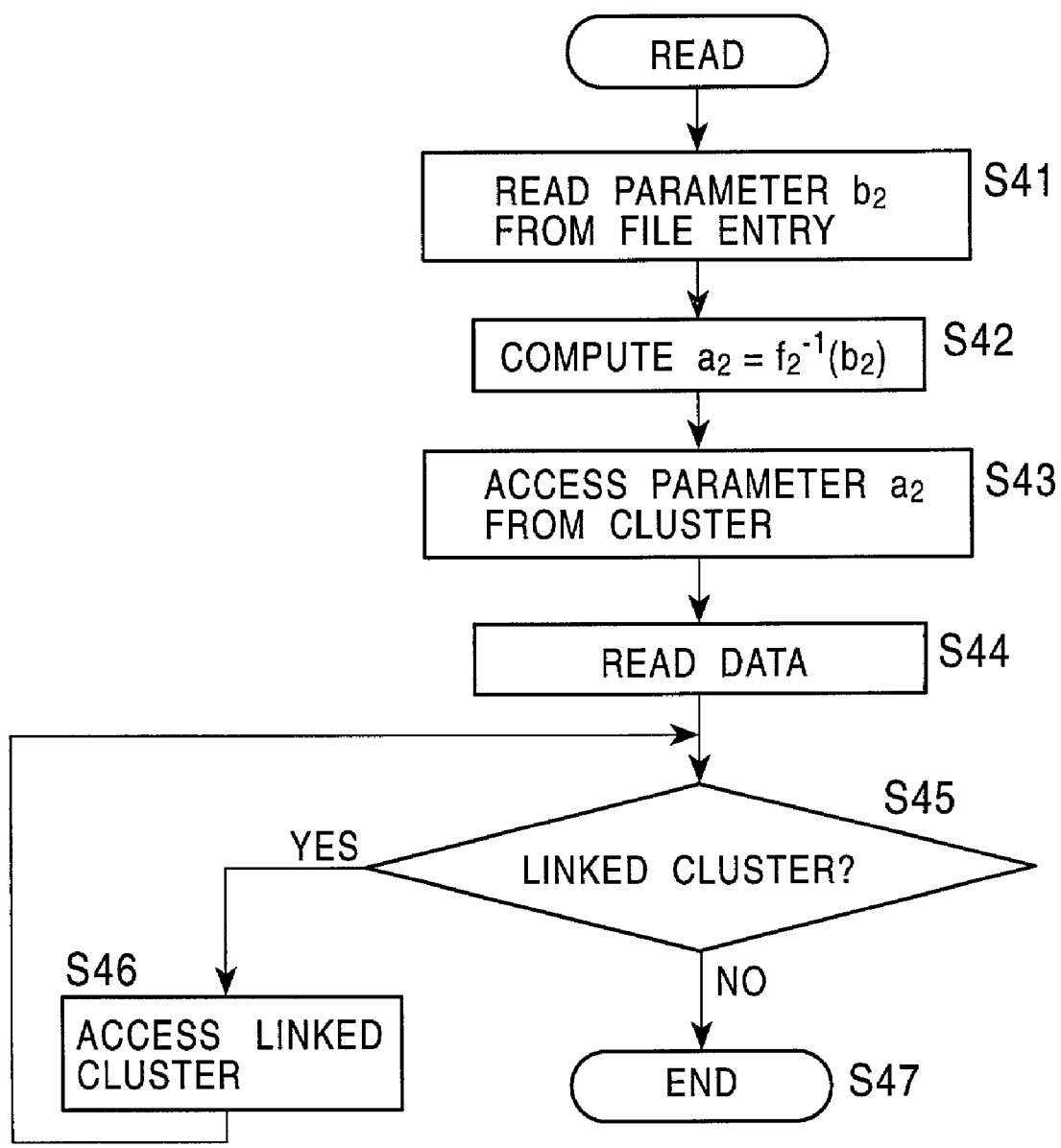
FIG. 13 is a flowchart of the copy protection method using file access restriction.

FIGS. 12 and 13 show flowcharts of file access processes when data is stored on the HDD 10 and when data is read from the HDD 10, respectively.

FIG. 12 shows a file data storing process. When a new file is desired to be recorded on the HDD 10, at step S31, an unused cluster is obtained by searching the linked list. At step S32, an entry cluster number, i.e., the parameter a2, is determined based on the unused cluster number found.

At step S33, the computation program using the mapping f2 for transforming the file access parameter a2, the program being stored in the ROM 6, is activated, thus obtaining the parameter b2 based on the parameter a2. At step S34, the transformed file access parameter b2 is stored in the parameter field 212 of the file entry (FIGS. 9A and 9B).

At step S35, data of the file is stored in the unused entry cluster. At step S36, the process determines whether data of the file is to be stored in subsequent unused clusters. If the result of the determination is affirmative, at step S37, data of the file is stored in a subsequent unused cluster.

If the result of the determination is negative, at step S38, the process determines that file data storing process terminates. The linked list is updated based on link information of the clusters having the data of the file stored therein. At step S39, the file data storing process terminates.

FIG. 13 shows a file data reading process. When a desired file is read, at step S41, the entry cluster number b2 of the desired file is read from the parameter field 212 of the file entry.

At step S42, the computation program using the inverse mapping $f2^{-1}$ for inverse-transformation of the entry cluster number b2, the program being stored in the ROM 6, is activated. The computation program computes $a2=f2^{-1}(b2)$, thus obtaining the actual parameter a2 based on the parameter b2.

At step S43, the cluster having the cluster number pointed to by the inverse-transformed file access parameter a2 is accessed. At step S44, data is read from the cluster having the cluster number pointed to the parameter a2.

At step S45, the process determines whether this cluster has a subsequent cluster based on the linked list. If the result of the determination is affirmative, the process proceeds to step S46 in which the subsequent cluster is accessed, otherwise the process proceeds to step S47 in which, since the process determines that there is no more data to read from this file, the file data reading process terminates.

In this example, the parameter that represents the entry cluster number of the file is transformed using the mapping intrinsic to the apparatus. Because of this, when the HDD 10 is changed, it is impossible to access the appropriate file entry. Accordingly, protection of the contents in the HDD 10 can be achieved.

Figures 14A, 14B:
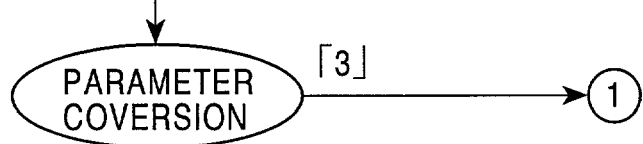
FIGS. 14A and 14B are diagrams showing the copy protection method using file access restriction.

For example, as shown in FIG. 14A, information is stored in file entries. When a file having the file name "ABC" is desired to be accessed, "4" is contained in the parameter field of the file entry of the file "ABC".

In this case, since the parameter value b2 is obtained as "4" by transformation, this value is not the actual parameter a2. Accordingly, in order to obtain the actual parameter a2, this parameter b2 must be inverse-transformed using the inverse mapping $f2^{-1}$.

As shown in FIG. 14A, the parameter "4" is transformed into the actual parameter "3" by means of the inverse mapping program (parameter transformation). Therefore, when the file having the file name "ABC" is accessed, the cluster having the cluster number "3", which indexes the cluster CL3 (FIG. 14B), is accessed.

In accordance with the linked list shown in FIG. 14B, clusters CL6, CL1, CL9, and CL11 are accessed in turn. Since the cluster CL11 contains "0" as the next cluster number, file access is stopped at the cluster CL11.

6. Protection Against Data Duplication Due to Sorting of Transferred Block Data

An example, in which transferred block data are sorted so that data transfer can be correctly performed in the hard disk only in a case in which the hard disk is connected to the same apparatus as the one which was connected to the hard disk when the data was stored, is described.

When music data is transferred from outside to the HDD 10 of the music server 50, the transferred data is temporarily stored in the DRAM 11, is read in certain units (blocks) from the DRAM 11, and then is stored in the HDD 10. On the other hand, when the music data is read from the HDD 10, the read data is temporarily stored on the DRAM 11, is read in certain units (blocks) from the DRAM 11, and then is output. A DMA (Direct Memory Access) controller 37 performs direct memory access control of the data transfer.

Figure 15A:
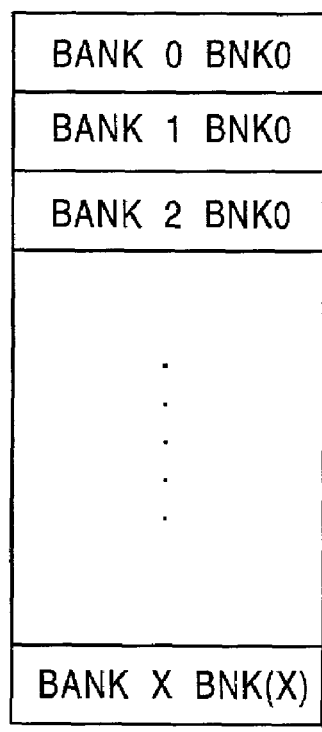
FIGS. 15A, 15B, and 15C are diagrams showing a copy protection method using sorting of transfer block data.
Figure 15B:
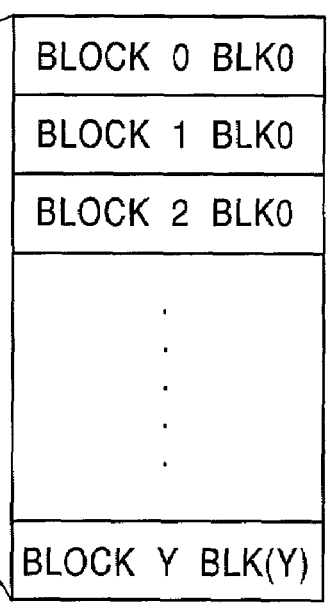

As shown in FIG. 15A, the DRAM 11 is divided into a plurality of banks, BNK0, BNK1, BNK2, . . . , and as shown in FIG. 15B, each bank is divided into a plurality of blocks, BLK0, BLK1, BLK2, . . . The size of each block corresponds to the size of the cluster.

When the music data is transferred in certain units from outside to the HDD 10, scrambling of the data can be achieved by sorting the data obtained by changing the data transfer sequence or by changing the offset of the transferred data.

In this example, a block sort parameter a3 is transformed into a parameter b3 using a mapping f3 intrinsic to the apparatus and the transformed parameter b3 is stored in the flash RAM 7. This enables data blocks stored in the HDD 10 to be sorted in accordance with the parameter a3. Therefore, when the HDD 10 is not connected to the same apparatus as the one which was connected to the HDD 10 when the data was stored, data transfer cannot be correctly performed.

Figure 16:
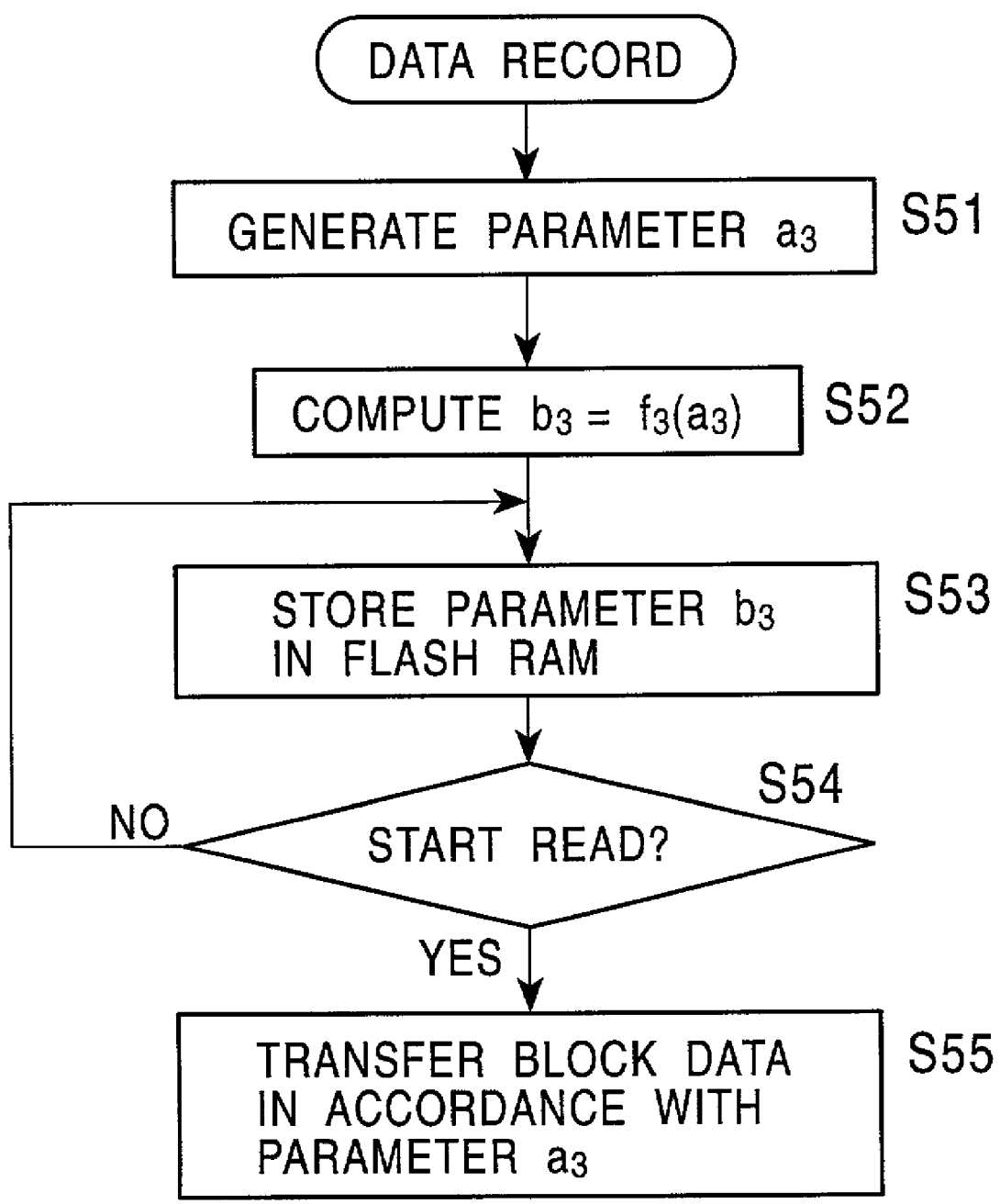
FIG. 16 is a flowchart of the copy protection method using sorting of transferred block data.
Figure 17:
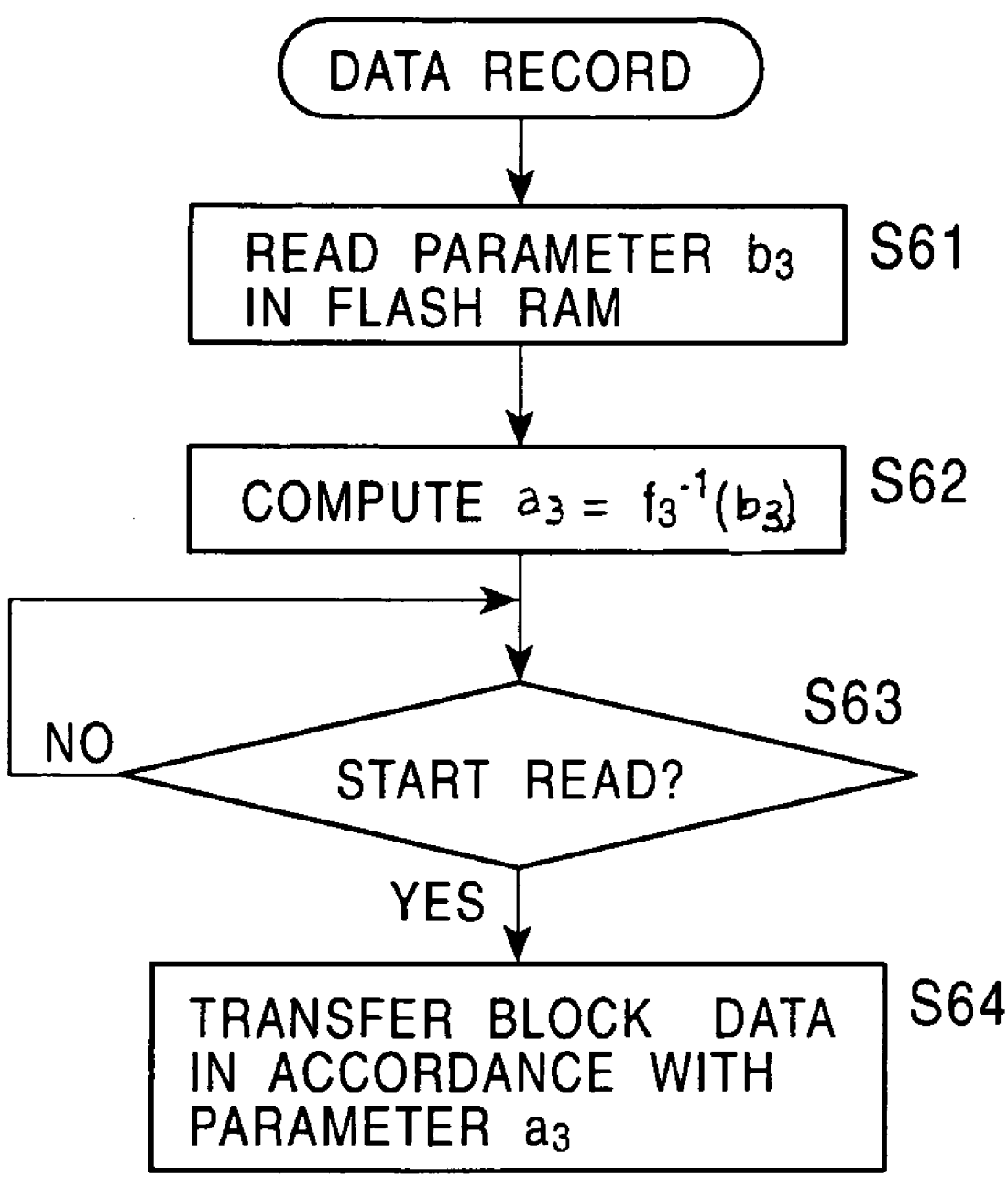
FIG. 17 is a flowchart of the copy protection method using sorting of transferred block data.

FIGS. 16 and 17 show the data block transfer processes, wherein FIG. 16 shows the process in which the data is stored in the HDD 10, and FIG. 17 shows the process in which the data is read from the HDD 10.

In FIG. 16, when data is stored in the HDD 10, the CPU 8 generates the block sort parameter a3 (step S51). At step S52, the computation program using the mapping f3 for transforming the parameter a3, the program being stored in the ROM 6, is activated. The computation program computes b3= f3(a3), thus obtaining the parameter b3 based on the parameter a3. At step S53, the parameter b3 is stored on the parameter field of the flash RAM 7.

At step S54, the data is transferred to be stored in the HDD 10. At step S55, blocks of the data, in which the number of the blocks is based on the parameter a3, are transferred in the data transfer manner based on the parameter a3 from a data input unit, including the compression encoder 12, the A/D converter 16, the IEC-958 encoder 18, the input terminals 13, 15, and 17, and the amplifier 14 to the DRAM 11.

In FIG. 17, when the data is read, the parameter b3 is read from the parameter field of the flash RAM 7 (step S61). At step S62, the computation program using the inverse mapping f3-1 for inverse-transforming the parameter b3, the program being stored in the ROM 6, is activated. The computation program computes $a3=f3^{-1}(b3)$, thus obtaining the parameter a3 based on the parameter b3.

When the data is transferred to be read from the HDD 10 (step S63), the data is transferred in the data transfer manner in accordance with the parameter a3 from the DRAM 11 to a data output unit (including the compression decoder 21, the D/A converter 22, and the amplifier 24) (step S64).

As a possible data transfer manner in accordance with the parameter, there is a manner in which, after blocks of data in which the number of the blocks corresponds to the parameter a3, are transferred to a temporary storage location, the blocks of data are transferred from the temporary storage location in reverse order of the blocks of data transferred to the temporary storage location. That is, when the data is stored in the HDD 10, after the blocks of data, in which the number of the blocks corresponds to the parameter a3, are transferred from the data input unit to the DRAM 11, the blocks are transferred from the DRAM 11 to the HDD 10 by reversing the order of the blocks transferred from the data input unit to the DRAM 11.

Figure 18:
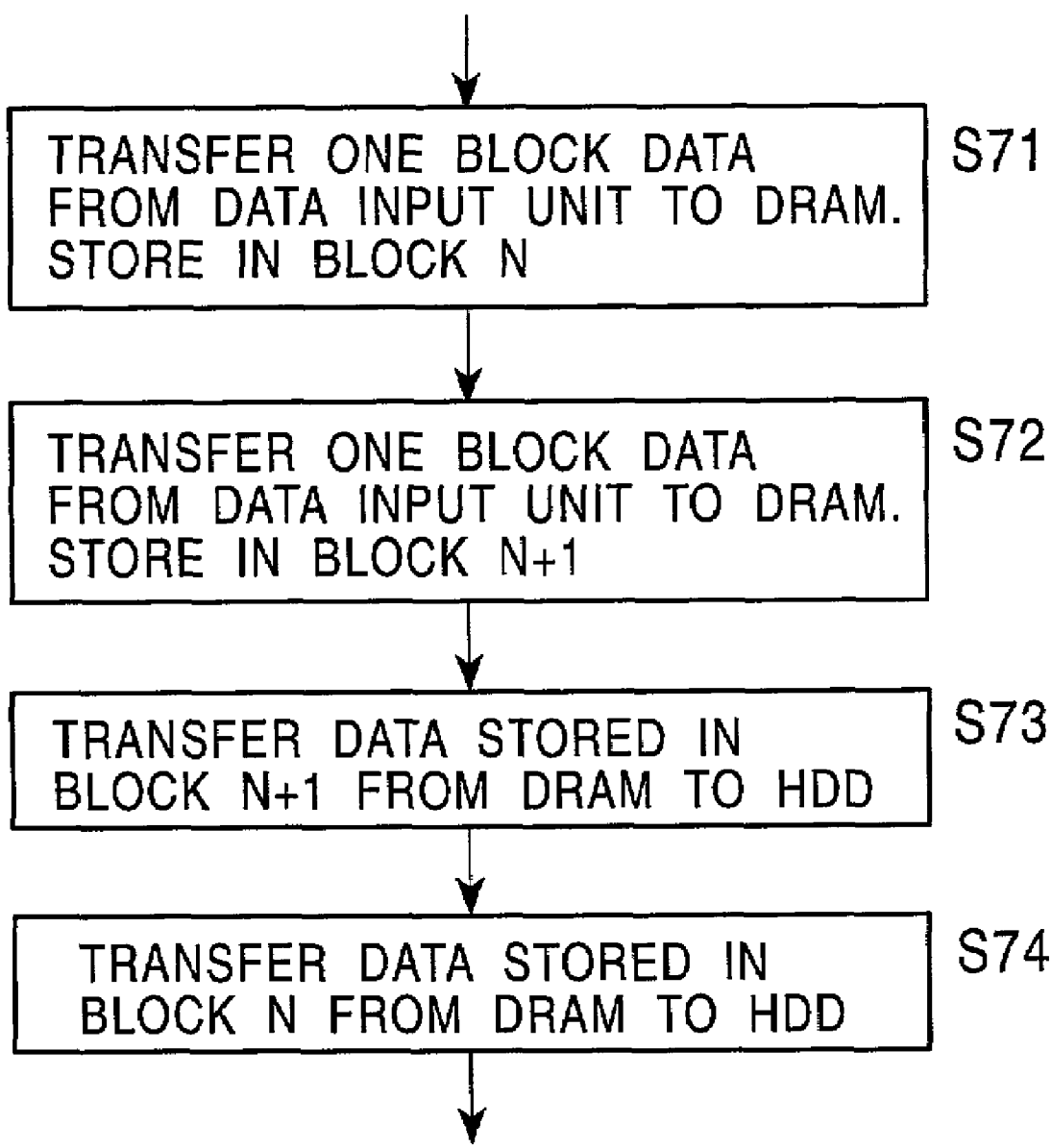
FIG. 18 is a flowchart of the copy protection method using sorting of transferred block data.

For example, in a case in which the parameter a3 is equal to 2, as shown in FIG. 18, one data block is transferred from the data input unit to the DRAM 11 and is stored in BLK N of the DRAM 11 (step S71). At step S72, another data block is transferred from the data input unit to the DRAM 11 and is stored in BLK (N+1) of the DRAM 11. Thus, after those two blocks of the data are transferred from the data input unit to the DRAM 11, the data stored in BLK (N+1) is transferred from the DRAM 11 to the HDD 10 (step S73). At step S74, the data stored in BLK N is transferred from the DRAM 11 to the HDD 10.

By transferring data in this manner, the data are stored in the HDD 10 so as to be alternately exchanged block by block.

Figure 19:
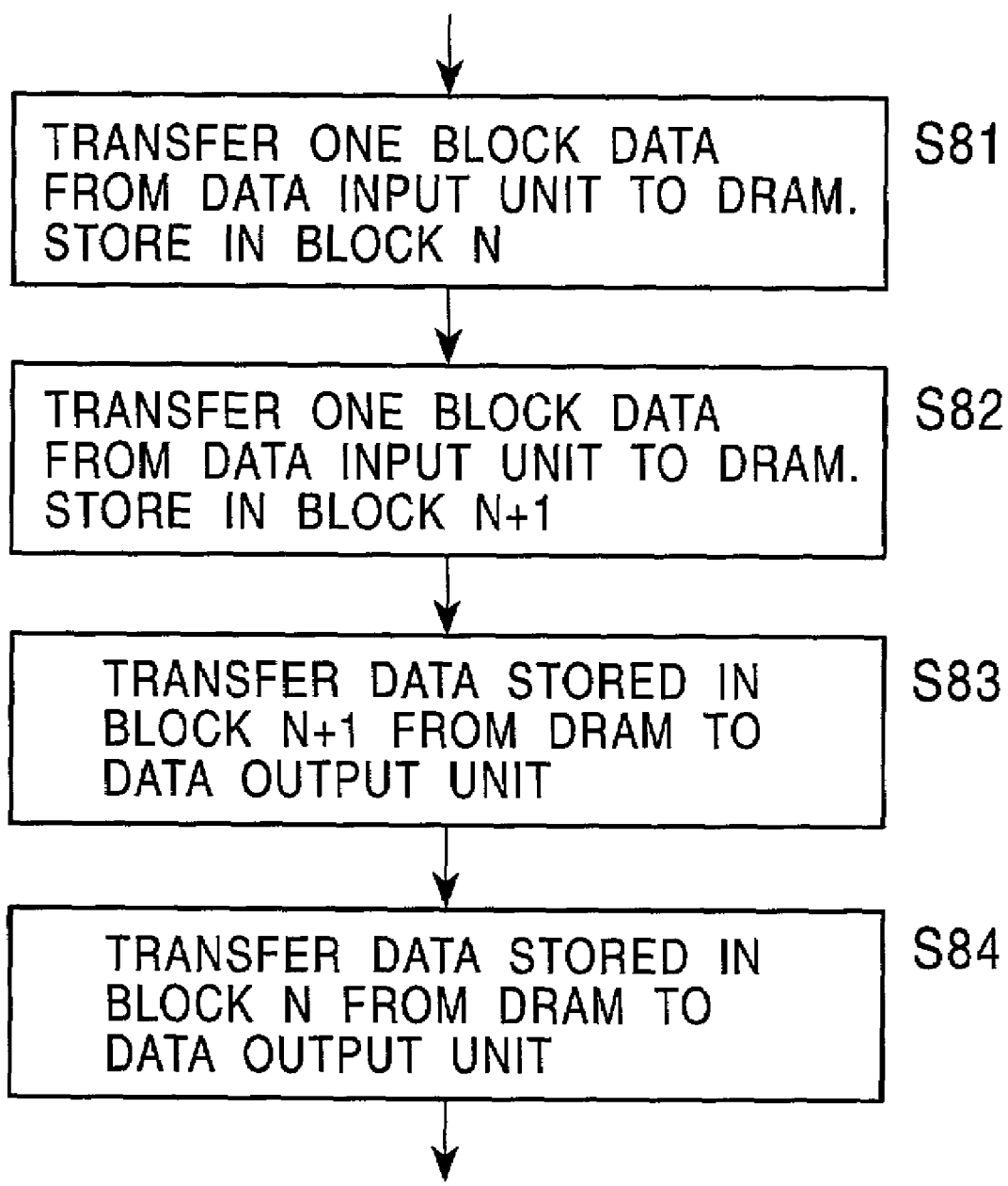
FIG. 19 is a flowchart of the copy protection method using sorting of transferred block data.

When data is read from the HDD 10, as shown in FIG. 19, one block (cluster) of data is read from the HDD 10, is transferred from the HDD 10 to the DRAM 11, and is stored in the BLK N of the DRAM 11 (step S81). At step S82, another block of data is read from the HDD 10, is transferred from the HDD 10 to the DRAM 11, and is stored in the BLK (N+1). Thus, after these two blocks of the data are transferred from the HDD 10 to the DRAM 11, the data stored in the BLK (N+1) is transferred from the DRAM 11 to the data output unit (step S83). At step S84, the data stored in the BLK N is transferred from the DRAM 11 to the data output unit.

Although the sorting method employed in the above-described example is performed by reversing the transfer order of blocks in which the number of the blocks corresponds to the parameter, other sorting methods may be employed.

7. Protection Against Data Duplication Due to Sorting of Transferred In-Block Data An example is described, in which transferred in-block data are sorted so that in-block data transfer can be correctly performed in the hard disk only in a case in which the hard disk is connected to the same apparatus as the one which was connected to the hard disk when the data was stored.

Figure 15C:
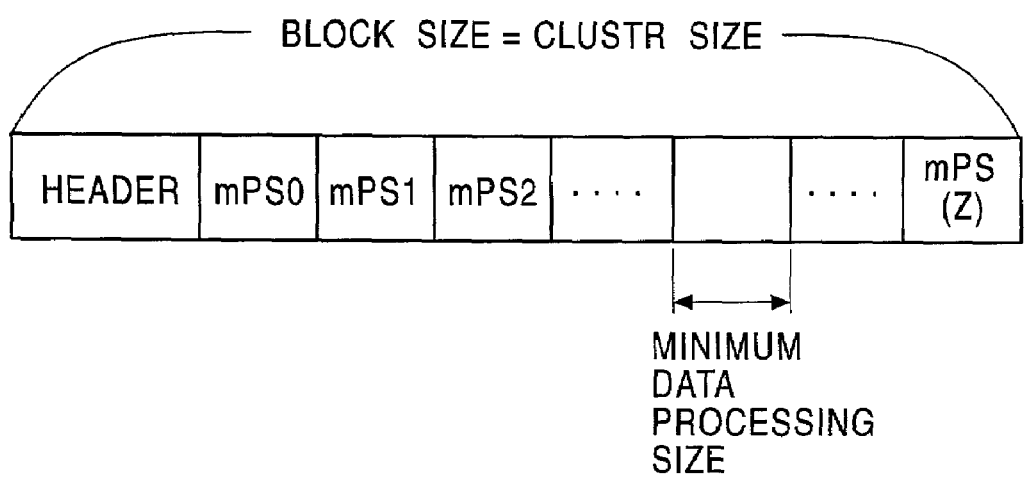

As shown in FIGS. 15A and 15B, the DRAM 11 is divided into a plurality of blocks BLK0, BLK1, BLK2, . . . As shown in FIG. 15C, each block includes a header region HA, and minimum data units mPS0, mPS1, mPS2, . . . The minimum data units mPS0, mPS1, mPS2, . . . are minimum-processing units for in-block data transfer. For example, in a case in which audio data is compressed and is transferred using ATRAC, the minimum-processing unit may be a sound group or the like.

When the music data are transferred from outside to the HDD 10, scrambling of data can be achieved by sorting the minimum-processing units of data within one block.

In this example, the data transfer order, the offset, or the like of the minimum-process units of data of one block is set as a parameter a4. This parameter a4 is transformed into a parameter b4 using a mapping f4 intrinsic to the apparatus, and the transformed parameter b4 is stored in the header region HA of the DRAM 11. Thus, the data stored in the HDD 10 are sorted in accordance with the parameter a4. Therefore, when the HDD 10 is not connected to the same apparatus as the one which was connected to the HDD 10 when the data was stored, data transfer cannot be correctly performed.

The parameter b4 stored in the header region HA is an in-block transfer parameter and is transformed using the mapping f4 intrinsic to the apparatus.

Figure 20:
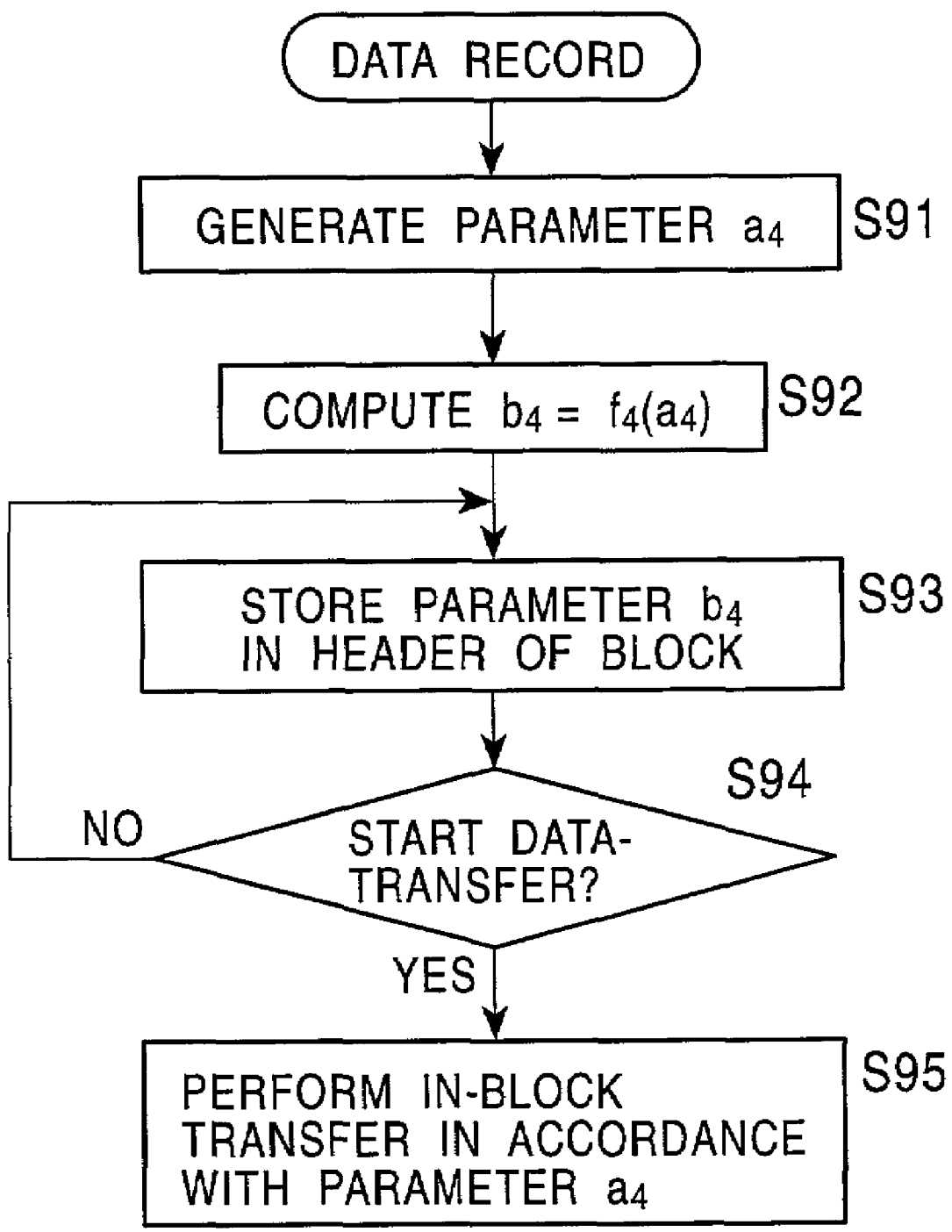
FIG. 20 is a flowchart of a copy protection method using sorting of transferred in-block data.
Figure 21:
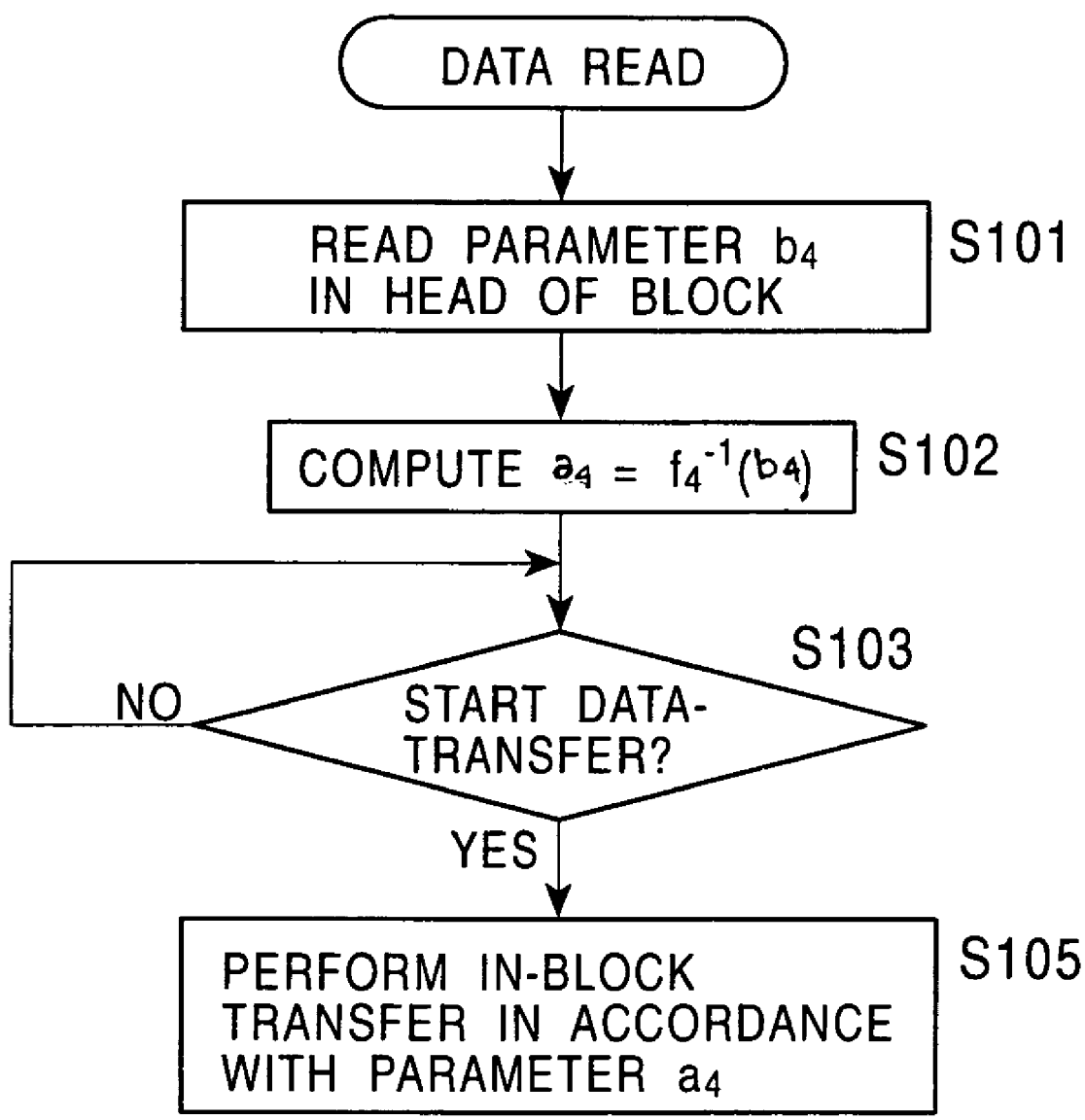
FIG. 21 is a flowchart of the copy protection method using sorting of transferred in-block data.

FIGS. 20 and 21 show in-block data transfer processes, wherein FIG. 20 shows the process in which the data is stored in the HDD 10, and FIG. 21 shows the process in which data is read from the HDD 10.

In FIG. 20, when the data is stored in the HDD 10, the CPU 8 generates the in-block transfer parameter a4 (step S91). At step S92, the computation program using the mapping f4 for transforming the parameter a4, the program being stored in the ROM 6, is activated. The computation program computes b4= f4(a4), thus obtaining the parameter b4 based on the parameter a4. At step S93, the parameter b4 is stored in the header region HA of the DRAM 11.

At step S94, the data is transferred to be stored on the HDD 10. At step S95, a minimum-processing unit of the data of the block is transferred from the data input unit to the HDD 10 in the manner based on the parameter a4 and in an order based on the parameter a4.

In FIG. 21, when the data is read from the HDD 10, the parameter b4 is read from the parameter field of the header region HA (step S101). At step S102, the computation program using the inverse mapping f4$^{-1}$ for inverse-transforming the transformed in-block data transfer parameter b4, the program being stored in the ROM 6, is activated. The computation program computes a4=f4$^{-1}$(b4), thus obtaining the original in-block data transfer parameter a4 based on the parameter b4.

At step S103, the data is transferred to be read from the HDD 10. At step S105, minimum-processing units of the data of the block are transferred in the manner based on the parameter a4.

As a possible data transfer manner in accordance with the parameter, there is a manner in which data are offset by a number of the processing units corresponding to the parameter. That is, when the data are stored on the HDD 10, by shifting the data by the number of the processing units corresponding to the parameter a4, the data are transferred from the data input unit to the DRAM 11 and are further transferred from the DRAM 11 to the HDD 10.

Figure 22:
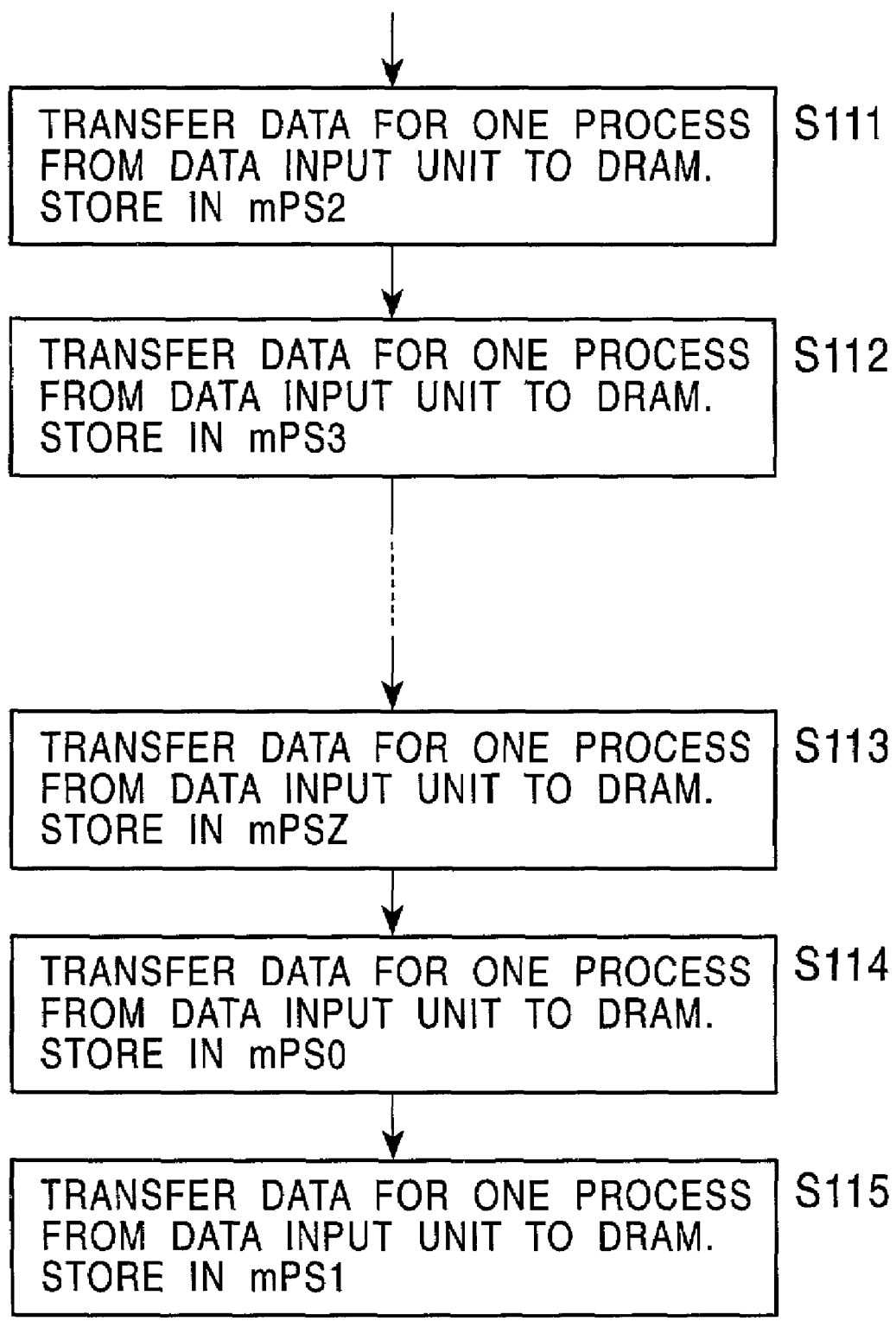
FIG. 22 is a flowchart of the copy protection method using sorting of transferred in-block data.

For example, in a case in which the parameter a4 is equal to 3, as shown in FIG. 22, when data are stored in the HDD 10, one processing unit of the data is transferred from the data input unit to the DRAM 11 and is stored in mPS2 which is offset by three processing units from the top of a block of the DRAM 11 (step S111). Another processing unit of the data is transferred from the data input unit to the DRAM 11 and is stored in mPS3 (step S112). Likewise, processing units of the data are transferred one after another from the data input unit to the corresponding minimum data units of the DRAM 11, i.e. mPS4, mPS5, . . . .

After one processing unit of the data is transferred to the last minimum data unit mPSZ of the block (step S113), the subsequent processing unit of the data is transferred to the first minimum data unit mPS0 of the block (step S114), and the further subsequent processing unit of the data is transferred to mPS1 (step S115).

When data is transferred to be read, as shown in FIG. 23, one processing unit of the data stored in mPS2, which is offset by three processing units from the top of a block of the DPAM 11, is transferred to the data output unit (step S121). At step S122, one processing unit of the data stored in mPS3 of the block of the DRAM 11 is transferred to the data output unit. Likewise, processing units of the data are each transferred one after another from corresponding minimum data units of the DRAM 11, that is, mPS4, mPS5, . . . to the data output unit.

After one processing unit of the data is transferred from the last minimum data unit mPSZ of the block to the data output unit (step S123), one processing unit of the data is transferred from the first minimum data unit mPS0 of the block to the output data unit (step S124), and one processing unit of the data is transferred from mPS1 to the data output unit (step S125).

Although the sorting method employed in the above-described embodiment is performed by shifting in-block data so as to be offset by processing units whose number corresponds to the parameter, other sorting methods may be employed.

8. Applications

All the copy protection methods described above are not necessarily used at the same time. By using one of them, a combination of some of them, or all of them, copy protection can be achieved even when the HDD 10 is changed.

The mapping and the inverse mapping programs, which are used in the foregoing examples, may be stored not only in the ROM 6 but also in the flash RAM 7. Furthermore, the mapping and the inverse mapping programs may employ different methods for each example or may employ the same methods for each example.

In the above examples, the case in which music data is stored in the HDD 10 of the music server is described. However, the present invention can be applied in the same manner to cases in which data such as still images, moving images, or text data are stored in the storage unit of another digital apparatus. This enables protection of copyrighted data to be achieved even when the storage unit is changed. Particularly, in the method in which the parameter pointing to the entry cluster number of a file is transformed using a mapping intrinsic to the apparatus, since this method uses the FAT entry number of the common DOS file format, the present invention can be easily implemented in a common apparatus using the DOS file format.

What is claimed is:

1. A recording and/or reproducing apparatus comprising:
   first storage means having a management area and a data area;
   second storage means having a pre-stored formula that is unique to said recording and/or reproducing apparatus;
   generating means for generating a predetermined value;
   transforming means for transforming said predetermined value based on a said formula and
   control means for controlling storage of said transformed predetermined value in said first storage means.

2. The recording and/or reproducing apparatus according to claim 1, further comprising
   initializing means for initializing said first storage means so that said first storage means has said management area and said data area, wherein
   said generating means generates said predetermined value when said initialization is performed.

3. The recording and/or reproducing apparatus according to claim 1, wherein said transforming means mapping-transforms said predetermined value.

4. The recording and/or reproducing apparatus according to claim 1, wherein said control means controls storage of said transformed predetermined value into said management area of said first storage means.

5. The recording and/or reproducing apparatus according to claim 4, further comprising:
   third storage means for storing said predetermined value;
   first read-out means for reading-out said transformed predetermined value stored in said management area of said first storage means,
   inverse transforming means for inverse-transforming said transformed predetermined value stored in said management area of said first storage means, where an inverse-transform of said inverse-trasforming means corresponds to said transform performed by said transforming means,
   second read-out means for reading-out said predetermined value stored in said third storage means,
   comparing means for comparing an inverse-transformed value of said inverse-transforming means with said predetermined value read out from said third read-out means, and
   authenticating means for performing authentication based on a comparison result of said comparing means.

6. The recording and/or reproducing apparatus according to claim 5, wherein said first read-out means reads out a value stored in said management area of said first storage means when electric power is supplied to said recording and/or reproducing apparatus by a user.

7. The recording and/or reproducing apparatus according to claim 5, wherein said first read-out means reads out a value stored in said management area when said first storage means is accessed.

8. The recording and/or reproducing apparatus according to claim 1, wherein said generating means generates an address based on information from said management area, and said transforming means transforms said address.

9. The recording and/or reproducing apparatus according to claim 8, wherein said generating means comprises:
   searching means for locating an unused area of said data area of said storage means based on information retrieved from said management area of said first storage means;
   logical-link forming means for forming a logical link from a first cluster number corresponding to said unused area, wherein
   said transforming means transforms said first cluster number and said control means controls storage of said transformed first cluster number and said logical link in said management area of said first storage means.

10. The recording and/or reproducing apparatus according to claim 9, further comprising:
    first read-out means for reading-out said cluster number and said logical link stored in said management area of said first storage means;
    inverse-transforming means for inverse-transforming said read cluster number, said inverse-transform corresponding to the transform performed by said transforming means; and
    second read-out means for reading-out data from said data area of said storage means according to said logical link from a first cluster number, said first cluster number being said inverse-transformed cluster number.

11. The recording and/or reproducing apparatus according to claim 1, further comprising:
    receiving means for receiving data in predetermined units from an external source; and
    third storage means for storing said transformed predetermined value, wherein
    said control means controls rearranging said data in said predetermined units according to said predetermined value and storing said rearranged data in said first storage means.

12. The recording and/or reproducing apparatus according to claim 11, further comprising:
    read-out means for reading-out a value from said third storage means; and
    inverse-transforming means for inverse-transforming said read-out value, said inverse-transform corresponding to said transform performed by said transforming means, wherein
    said control means controls rearranging said data stored in said first storage means in said predetermined units according to said inverse-transformed value.

13. The recording and/or reproducing apparatus according to claim 11, wherein said control means controls rearranging said data in units of blocks according to said predetermined value and storing said rearranged data in said first storage means.

14. The recording and/or reproducing apparatus according to claim 12, wherein said control means controls rearranging said data in reverse order in said predetermined units according to said predetermined value and storing said rearranged data in said first storage means; and controls rearranging said data stored in said first storage means in reverse order in said predetermined units according to said inverse-transformed value.

15. The recording and/or reproducing apparatus according to claim 1, further comprising:
receiving means for receiving data from an external source, wherein
said first storage means stores said transformed predetermined value and said control means controls rearranging said received data in processing units according to said predetermined value and storing said rearranged data in said first storage means.

16. The recording and/or reproducing apparatus according to claim 15, further comprising
read-out means for reading-out a value stored in said third storage means; and
inverse-transforming means for inverse-transforming said read-out value, said inverse-transform corresponding to said transform performed by said transforming means, wherein
said control means controls rearranging said data stored in said first storage means in said processing units according to said inverse-transformed value.

17. The recording and/or reproducing apparatus according to claim 16, wherein said first storage means stores said transformed predetermined value in a header of said received data;
said control means controls rearranging said data in minium processing units within said data and storing said data in said first storage means;
said read-out means reads out a value from said header of said data stored in said first storage means; and
said control means controls rearranging said data stored in said first storage means in minimum processing units according to said inverse-transformed value.

18. The recording and/or reproducing apparatus according to claim 17, wherein said control means controls rotating said data in said minimum units within said data according to said predetermined value and storing said data in said first storage means.

19. The recording and/or reproducing apparatus according to claim 1, wherein said first storage means is managed by a file allocation table.

20. The recording and/or reproducing apparatus according to claim 1, wherein said first storage means includes a hard disk.

21. A method for use in a recording and/or reproducing apparatus including first storage means having a management area and a data area and second storage means for storing a formula, the method comprising the steps of:
generating a predetermined value;
transforming said predetermined value based on said formula which is pre-stored in said second storage means and unique to said recording and/or reproducing apparatus; and
storing said transformed predetermined value in said first storage means.

* * * * *